(12) United States Patent
Grochal et al.

(10) Patent No.: US 7,686,879 B2
(45) Date of Patent: Mar. 30, 2010

(54) COATING COMPOSITION

(75) Inventors: Peter Grochal, Waldshut (DE); Werner Duttlinger, Bonndorf (DE); Michael Troll, Bonndorf-Dillendorf (DE); Josef Ermuth, Weisbaden (DE)

(73) Assignee: STO AG, Stuhlingen (DE)

( * ) Notice: Subject to any disclaimer, the term of this patent is extended or adjusted under 35 U.S.C. 154(b) by 0 days.

(21) Appl. No.: 11/628,403

(22) PCT Filed: Apr. 6, 2005

(86) PCT No.: PCT/EP2005/003622

§ 371 (c)(1),
(2), (4) Date: May 11, 2007

(87) PCT Pub. No.: WO2005/118726

PCT Pub. Date: Dec. 15, 2005

(65) Prior Publication Data

US 2008/0011195 A1    Jan. 17, 2008

(30) Foreign Application Priority Data

Jun. 4, 2004    (DE) .................. 10 2004 027 379

(51) Int. Cl.
C23C 16/40 (2006.01)
C08J 5/12 (2006.01)
C04B 28/36 (2006.01)
C04B 28/26 (2006.01)
C09C 1/36 (2006.01)

(52) U.S. Cl. .............. 106/287.19; 106/287.3; 106/287.32; 106/287.34; 106/436; 428/323; 428/327; 428/328; 428/329; 428/330; 428/331; 428/332; 428/333

(58) Field of Classification Search ............ 106/287.19, 106/287.3, 287.32, 287.34, 436; 428/323, 428/327–333
See application file for complete search history.

(56) References Cited

U.S. PATENT DOCUMENTS

| | | | | |
|---|---|---|---|---|
| 4,307,005 A * | 12/1981 | Renner et al. | ............ | 524/512 |
| 4,888,101 A * | 12/1989 | Cooper | ............ | 204/157.15 |
| 5,359,861 A * | 11/1994 | Maier-Laxhuber et al. | .... | 62/100 |
| 6,472,346 B1 * | 10/2002 | Linkous | ............ | 504/120 |
| 6,479,141 B1 * | 11/2002 | Sanbayashi et al. | ......... | 428/323 |
| 6,569,520 B1 * | 5/2003 | Jacobs | ............ | 428/330 |

(Continued)

FOREIGN PATENT DOCUMENTS

EP    0963789 A3    8/2000

(Continued)

OTHER PUBLICATIONS

R. Asahi, et al., Visible-Light Photocatalysis in Nitrogen-Doped Titanium Oxides; research article; Jul. 13, 2001; pp. 269-271; vol. 293, Science Magazine.

*Primary Examiner*—Anthony J Green
*Assistant Examiner*—Pegah Parvini
(74) *Attorney, Agent, or Firm*—Schwabe, Williamson & Wyatt, P.C.

(57) ABSTRACT

Embodiments of the present invention provide coating materials including at least one binder and at least one photocatalytically-active substance adapted to absorb light at one or more absorption wavelengths in the range of about 380 nm to about 500 nm. Other embodiments may be described and claimed.

30 Claims, 12 Drawing Sheets

U.S. PATENT DOCUMENTS

| | | | |
|---|---|---|---|
| 7,175,911 B2 * | 2/2007 | Zhou et al. | 428/403 |
| 2003/0022502 A1 * | 1/2003 | Matsui et al. | 438/692 |
| 2003/0082367 A1 * | 5/2003 | Talpaert et al. | 428/328 |
| 2005/0226761 A1 * | 10/2005 | Orth-Gerber et al. | 420/417 |
| 2005/0227854 A1 * | 10/2005 | Orth-Gerber et al. | 502/100 |

FOREIGN PATENT DOCUMENTS

| | | |
|---|---|---|
| EP | 1285953 A1 | 2/2003 |
| JP | 54141822 | * 11/1979 |

* cited by examiner

The Kubelka-Munk function plotted on the ordinate is proportional to absorbance (extinction)

US 7,686,879 B2

COATING COMPOSITION

CROSS REFERENCE TO RELATED APPLICATIONS

The present application claims priority under 35 U.S.C. §120 to International Patent Application No. PCT/EP2005/003622, filed Apr. 6, 2005, entitled "Coating Composition" and International Priority under 35 U.S.C. §119 to co-pending German Patent Application No. 10 2004 027 379.0, filed Jun. 4, 2004, entitled "Beschichtungszusammensetzung"; the entire contents and disclosures of which are hereby incorporated by reference in its entirety.

TECHNICAL FIELD

Embodiments of the invention relate to compositions for coating walls, facades or the like.

BACKGROUND

Coating compositions may be used, for example, for the manufacture of paints and plaster systems for interior and exterior applications. A special area of application of such compositions is the manufacture of thermal insulation composite systems. In these applications, these compositions can especially be used for the manufacture of a top coating for thermal insulation composite systems. Here, in some cases, algae and fungus infestation of the top coating can occur following the completion of the respective thermal insulation composite systems, particularly on the northern side of buildings.

SUMMARY OF THE INVENTION

In view of the problems in the state of the art, embodiments of the invention are based on the problem of providing coating compositions for effectively resisting algae and/or fungus growth, and methods for producing such coating compositions.

In accordance with embodiments of the invention, algae and/or fungus growth may be minimized or prevented with a coating composition including a photocatalytically active substance having a significant light absorption with at least one absorption wavelength in the range of 380 to 500 nm.

Embodiments of the invention are based in part on the insight that photocatalytically active substances can be used not only for the degradation of pollutants, as set forth in DE 100 64 317 A1, but also for the blocking of the cell growth of algae and fungi. In this process, the special properties of a photocatalytically active substance, which may be used in accordance with embodiments of the invention, may enable the utilization of normal sunlight hitting coatings on interior spaces and also the northern side of buildings via reflection and dispersion, while at the same time ensuring the photocatalysis of the photocatalytically active substance due to the use of the binders with the properties described. Overall, a coating composition including a photocatalytically active substance may effectively reduce algae and/or fungus growth even without the use of the traditionally employed biocides to inhibit algae and fungus growth.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings, in which.

DETAILED DESCRIPTION

Figure 1:
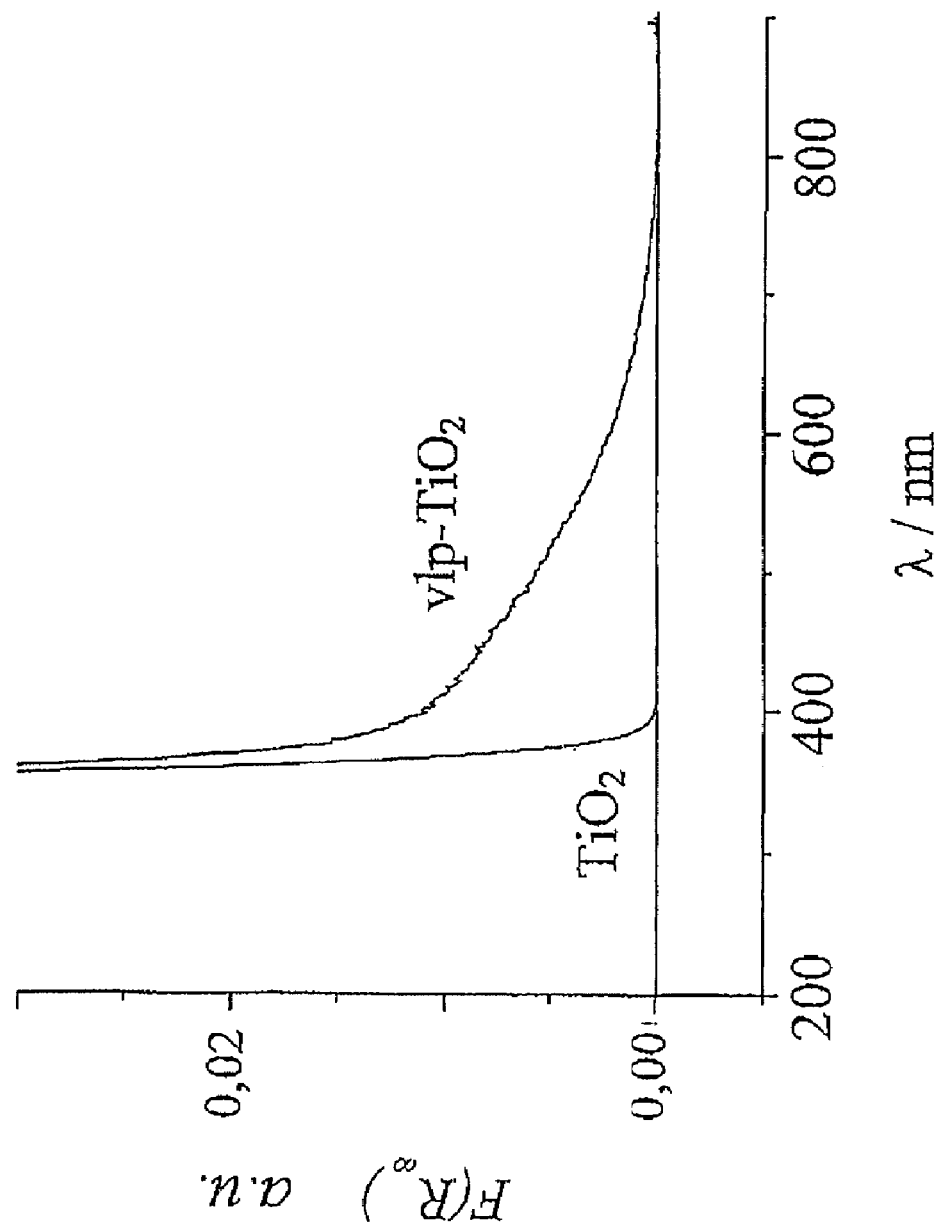
FIG. 1 shows a Kubelka-Munk function $F(R_{OO})$ (arbitrary units) proportional to the relative absorbance for unmodified $TiO_2$ and for $TiO_2$ modified with C (vlp-$TiO_2$) as a function of the wavelength, in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the described embodiments of the present invention, the phrase "A/B" means A or B. For the purposes of the described embodiments of the present invention, the phrase "A and/or B" means "(A), (B), or (A and B)." For the purposes of the described embodiments of the present invention, the phrase "at least one of A, B, and C" means "(A), (B), (C), (A and B), (A and C), (B and C), or (A, B and C)." For the purposes of the described embodiments of the present invention, the phrase "(A)B" means "(B) or (AB)," that is, A is an optional element.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous.

The description will be presented in sections. Employment of section labels is to facilitate ease of understanding, and is not to be construed as limiting on the invention. Various operations will be described as multiple discrete steps in turn, in a manner that is most helpful in understanding the present invention; however, the order of description should not be construed as to imply that these operations are necessarily order dependent. In particular, these operations need not be performed in the order of presentation Embodiments of the present invention are directed to coating compositions including a photocatalytically-active substance for resisting algae and/or fungus growth, and to methods of making said coating compositions.

In accordance with embodiments of the invention, algae and/or fungus growth may be minimized or prevented with a coating composition including a photocatalytically-active substance having a significant light absorption *** at at least one absorption wavelength in the range of 380 to 500 nm.

In various embodiments, a coating material may include a photocatalytically active substance and a binder. In a preferred embodiment of a coating composition, the ratio of absorbance (Kubelka-Munk function $F(R_{OO})$) of the photocatalytically active substance to the absorbance (Kubelka-Munk function $F(R_{OO})$) of the binder is greater than 6.25×10−3, preferably greater than $1 \times 10^{-2}$ *** at at least one absorption wavelength in the range of 380 and 500 nm. In this exemplary embodiment of a coating composition, the binder may exhibit an absorbance of less than 0.8, preferably less than 0.5, at one or more absorption wavelengths in the range of 380 to 500 nm, preferably in the range of 400 to 450 nm. The photocatalytically active substance may exhibit an absorbance of more than 0.005, preferably more than 0.01, and especially preferably 0.02 or more, under the same measuring conditions at the absorption wavelength.

Binders according to various embodiments may include an organic component and/or an inorganic component. The use of a binder including exclusively inorganic materials may be particularly expedient with respect to the prevention of a photocatalytically-induced decomposition of the binder.

In an especially preferred embodiment of the invention, the binder may include at least one organic component and at least one inorganic component. By carefully selecting the binder, it may be possible to ensure that radicals produced by the photocatalytically-active substance do not result in the decomposition of the binder and a respective chalking of the wall or facade coating. In accordance with an especially preferred embodiment of the invention, the photocatalytically active substance may comprise a semiconductor. By including a semiconductor, the photocatalytic action may be generated by the production of electron hole pairs at the incidence of light, which may produce highly-reactive free radicals at the surface of the coating material which may contribute to the blocking of algae and/or fungus cell growth. In an exemplary embodiment, the photocatalytically-active substance may comprise titanium dioxide ($TiO_2$). By using titanium dioxide, it may be possible to achieve a photocatalytic action in the wavelength range of 400 to 450 nm. The photocatalytic action may occur upon mixing. In some embodiments, the photocatalytic action may occur upon doping with another substance, such as, for example, sulfur (S), nitrogen (N), and/or carbon (C).

In various embodiments, it may be especially advantageous if the sulfur and/or carbon content of the titanium dioxide used as a photocatalytically active substance is 0.05 to 4 percent by weight, preferably 0.05 to 2 percent by weight and especially preferably 0.4 to 1.5 percent by weight. In various embodiments, the titanium dioxide, particularly when mixed with sulfur and/or carbon, may be present in the anatase phase. In embodiments wherein the titanium dioxide is mixed with sulfur and/or carbon, in may be particularly advantageous if the sulfur and/or carbon is incorporated only in a surface layer of the titanium dioxide particles of the coating composition.

In embodiments, a coating composition may be particularly efficacious if the photocatalytically-active substance has a specific surface pursuant to the Brunauer, Emmett and Teller (BET) method of 100 to 250 $m^2/g$, preferably 130 to 170 $m^2/g$. In various embodiments, the photocatalytically-active substance may not show carbonate bands either in the X-ray photoelectron spectrum or in the infrared spectrum. In view of a particularly high absorbance of the photocatalytically-active substance in the range of 400 to 450 nm, it may be advantageous if the photocatalytically active substance is at least partially prepared by mixing a titanium-containing compound, preferably dissolved in a solvent, with an organic carbon compound and by thermal treatment of this mixture at a temperature of 500° C. or less, preferably 400° C. or less, and especially preferably 350° C. or less, and 150° C. or more, especially preferably 200° C. or more.

In embodiments, the photocatalytically-active substance obtained may exhibit especially strong absorption bands given a bond energy of 285.6 eV in the X-ray photo-electron spectrum (XPS) relative to the O1s band at 530 eV.

In embodiments, suppression of the algae and/or fungus cell growth may be particularly effective using an amorphous titanium oxide, a partially crystalline titanium oxide, a crystalline titanium oxide, a hydrous titanium oxide, a titanium hydrate, or a titanium oxyhydrate to produce the photocatalytically-active compound. In embodiments, the titanium-containing compound may comprise a titanium hydrate formed from a sulfate process. In various ones of these embodiments, the titanium hydrate may be neutralized and washed beforehand, so that the $SO_3$ content of the solid substance after drying is less than 1 percent by weight. The carbon compound employed for the production of the photocatalytically-active substance used in embodiments of the coating composition may have a decomposition temperature of 400° C. or less, preferably 350° C. or less, particularly preferably 300° C. or less. In this context, the carbon compound may comprise at least one functional group, such as, for example, an OH—, CHO—, COOH— and $NH_x$ and/or SH$_x$ group. The use of ethylene glycol, glycerin, carbohydrates, ammonium hydroxides, or mixtures thereof may be especially expedient. In addition or as an alternative, carbon black or activated charcoal may be used as a carbon compound. In the production of the photocatalytically-active substances used in embodiments of a coating composition, the thermal treatment may take place in a calcination unit, preferably a rotary furnace, which may be operated continuously. In various ones of these embodiments, the titanium dioxide may be a commercially-available titanium dioxide in powder or sludge form. The titanium dioxide may be used for the preparation of a suspension in a solvent, and a small amount of a carbon disulphide compound may be added to and mixed with the suspension. In various ones of these embodiments, the solvent may then be removed, the residue dried at a drying temperature, and then calcinated at a calcination temperature. In various embodiments, the solvent may comprise water.

In various embodiments, the photocatalytically-active substance may exhibit an especially strong photocatalytic action if the dried residue is heated in a closed container to about 300° C. within one hour and then maintained at the temperature for about another three hours. The calcination of the powdery residue by heating expediently takes place until, after a color change from white to dark brown, another color change to beige takes place.

In embodiments, in addition to the at least one binder and the photocatalytically-active substances, the coating composition may further comprise any one or more of the following: at least one dispersing agent, at least one sodium salt, at least one thickening agent, at least one anti-foaming agent, at least one pigment, at least one filler, at least hydrophobization agent, at least one microbiocide, and at least one preservative. In various ones of these embodiments, the dispersing agent may comprise a selected one or more of, for example, sodium polyphosphate and/or a solution of polyacrylate. A thickening agent may comprise a selected one or more of, for example, modified methyl hydroxy ethyl cellulose, hydrophobic polyurethane, cellulose ether, and/or a polysaccharide. An anti-foaming agent may comprise a selected one or more of, for example, a mixture of paraffin oil, hydrophobic silicic acid, and emulsifying agents, and/or polysiloxane copolymer with hydrophobic silicic acid, emulsified in water. A pigment may comprise, for example, titanium dioxide. A filler may comprise a selected one or more of, for example, a silicate, and/or kaolin or the like. A hydrophobization agent may comprise, for example, a potassium methyl siliconate in aqueous solution. A microbiocide and/or in-can preservative may comprise, for example, isothiazolinone.

In embodiments, the coating composition may comprise a structure with a grain size of up to 6 mm. In addition or as an alternative, embodiments of the coating composition may comprise one or more adsorbing agents. An adsorbing agent may comprise a selected one or more of, for example, activated charcoal, silicic acid, micro silica, silica gels, zeolites, bentonites, diatomaceous earth, and/or foamed glass or the like. In some of these embodiments, the substances adsorbed on the adsorbing agent(s) may be effectively decomposed using the photocatalytically-active substance of the coating composition.

In embodiments, it may be especially advantageous if the coating composition is a supercritical composition in which the solid fraction is adjusted to the liquid fraction or the binder fraction such that no complete wetting of the solids takes place. In some of these embodiments, a porous coating is formed, which may eliminate or reduce contact and/or maintenance of contact between the pollutants and the photocatalytically-active substance.

In embodiments, particularly in embodiments of coating compositions comprising titanium dioxide including sulfur and/or carbon, the photocatalytically-active substances may exhibit an electron spin resonance spectrum with a significantly increased light absorption, as compared to pure titanium dioxide, in the wavelength range of over 400 nm (vlp-TiO$_2$), which, when measured at a temperature of 5 K, may exhibit a significant signal only in the g value range of 1.97 to 2.05.

With respect to embodiments of methods of producing embodiments of coating compositions, and as discussed again below, it may be especially advantageous to produce, in a first operation, an intermediate product by dispersing the photocatalytically-active substance in an inorganic binder and to mix this intermediate product in a second operation with an organic binder. In this process, coagulates may be produced in the first operation from the photocatalytically-active substance, and the inorganic binder may be generally inert with respect to the radicals that may be produced with the photocatalytically-active substance. In embodiments, the coagulates may be capable of bonding to each other in the second operation via the organic binder.

Exemplary preferred embodiments of the invention are listed below, with the numerical data referring to weight percentages of the respective components of the compositions.

EXAMPLE 1

Silicone Resin Paint for Interior Applications

| Water | — | 35.7 |
|---|---|---|
| Isothiazolinones | Microbiocide | 0.4 |
| Salts of polyacrylic acid or phosphate esters and tetra potassium pyrophosphate | Dispersing agent | 0.9 |
| Mineral oil | Anti-foaming agent | 0.4 |
| Cellulose thickening agent | Thickening agent | 0.6 |
| Polysiloxane | Hydrophobization | 1.0 |
| Silicone resin emulsion | Binder | 4.0 |
| Titanium dioxide | White pigment | 13.0 |
| Photocatalytic titanium dioxide | Pigment | 10.0 |
| Silicates | Filler | 10.0 |
| Kaolin | Filler | 9.0 |
| Styrene/acrylate | Binder | 15.0 |

EXAMPLE 2

Silicate Paint for Interior Applications

| Water | — | 26.6 |
|---|---|---|
| Cellulose ether and polysaccharides | Thickening agent | 0.4 |
| Tetra alkyl alkylene diamine | Stabilizer for water glass | 0.2 |
| Polyacrylate with sodium salt | Dispersing agent | 0.1 |
| Potassium water glass | Binder | 14.0 |
| Potassium methyl siliconate | Hydrophobization | 1.0 |
| Photocatalytic titanium dioxide | Pigment | 10.0 |
| Titanium dioxide | White pigment | 22.0 |
| Kaolin | Filler | 10.0 |
| Silicates | Filler | 7.0 |
| Polysiloxane copolymer | Anti-foaming agent | 0.2 |
| Styrene/acrylate | Binder | 8.5 |

EXAMPLE 3

Silicate/Silicone Paint for Interior Applications

| | | |
|---|---|---|
| Water | — | 26.5 |
| Cellulose ether and polysaccharides | Thickening agent | 0.4 |
| Tetra alkyl alkylene diamine | Stabilizer for water glass | 0.2 |
| Polyacrylate with sodium salt | Dispersing agent | 0.1 |
| Silicone resin emulsion | Binder | 4.3 |
| Potassium water glass | Binder | 14.0 |
| Potassium methyl siliconate | Hydrophobization | 1.0 |
| Photocatalytic titanium dioxide | Pigment | 10.0 |
| Titanium dioxide | White pigment | 22.0 |
| Kaolin | Filler | 10.0 |
| Silicates | Filler | 7.0 |
| Polysiloxane copolymer | Anti-foaming agent | 0.2 |
| Styrene/Acrylate | Binder | 4.3 |

EXAMPLE 4

Silicone Plaster for Interior Applications

| | | |
|---|---|---|
| Water | — | 13.8 |
| Polysaccharide and cellulose | Thickening agent | 0.5 |
| Salt of polyacrylic acid | Dispersing agent | 0.1 |
| Silicone resin emulsion | Binder | 3.0 |
| Titanium dioxide | White pigment | 0.8 |
| Photocatalytic titanium dioxide | Pigment | 10.0 |
| Vinyl acetate ethylene copolymerizate | Binder | 3.0 |
| Silicates | Filler | 1.4 |
| Calcium carbonate | Filler | 25.9 |
| Diatomaceous earth | Filler | 2.9 |
| Isothiazonlinone | Microbiocide | 0.2 |
| Wax dispersion | Hydrophobization | 0.4 |
| Calcium carbonate | Structural sand | 38.0 |

EXAMPLE 5

Silicate Plaster for Interior Applications

| | | |
|---|---|---|
| Water | — | 24.5 |
| Cellulose ether | Thickening agent | 0.2 |
| Potassium hydroxide | pH regulator | 0.1 |
| Silicic acid | Anti-foaming agent | 0.1 |
| Sodium salt | Dispersing agent | 0.4 |
| Calcium hydroxide | Binder | 8.0 |
| Photocatalytic titanium dioxide | Pigment | 10.0 |
| Titanium dioxide | White pigment | 3.0 |
| Cellulose | Filler | 1.0 |
| Ethylene vinyl ester terpolymer | Binder | 2.9 |
| Linseed oil stand oil | Binder | 0.4 |
| Silicon dioxide | Filler | 9.4 |
| Calcium carbonate | Structural sand | 40.0 |

EXAMPLE 6

Silicone Resin Paint for Exterior Applications

| | | |
|---|---|---|
| Water | — | 31.0 |
| Salts of polyacrylic acid and sodium polyphosphate | Dispersing agent | 0.4 |
| Isothiazolinones | Microbiocide | 1.2 |
| Cellulose | Thickening agent | 0.3 |
| Siloxanes | Anti-foaming agent | 0.3 |
| Dicarboxylic acid ester | Film formation agent | 1.0 |
| Silicone resin emulsion | Binder | 9.3 |
| Photocatalytic titanium dioxide | Pigment | 5.0 |
| Titanium dioxide | White pigment | 12.0 |
| Calcium carbonate | Filler | 17.7 |
| Magnesium aluminum silicate | Filler | 12.0 |
| Caustic soda | pH regulator | 0.1 |
| Styrene/acrylate | Binder | 9.5 |
| Polyurethane | Thickening agent | 0.2 |

EXAMPLE 7

Silicate Paint for Exterior Applications

| | | |
|---|---|---|
| Water | — | 18.0 |
| Cellulose ether, saccharides, and acrylates | Thickening agent | 0.7 |
| Tetra alkyl alkylene diamine | Stabilizer for water glass | 0.3 |
| Polycarboxylic acid and ammonium derivative | Dispersing agent | 0.2 |
| Potassium methyl siliconate and polysiloxane | Hydrophobization | 1.0 |
| Potassium water glass | Binder | 20.0 |
| Photocatalytic titanium dioxide | Pigment | 5.0 |
| Titanium dioxide | White pigment | 12.0 |
| Kaolin | Filler | 1.0 |
| Diatomaceous earth, silicates, and silicon dioxide | Filler | 12.0 |
| Barium sulfate | Filler | 20.0 |
| Solvent | Film formation agent | 0.6 |
| Styrene/acrylate | Binder | 9.0 |
| Siloxanes | Anti-foaming agent | 0.2 |

EXAMPLE 8

Silicate/Silicone Paint for Exterior Applications

| | | |
|---|---|---|
| Water | — | 18.0 |
| Cellulose ether, saccharides, and acrylates | Thickening agent | 0.7 |
| Tetra alkyl alkylene diamine | Stabilizer for water glass | 0.3 |
| Polycarboxylic acid and ammonium derivative | Dispersing agent | 0.2 |
| Silicone resin emulsion | Binder | 5.0 |
| Potassium methyl siliconate and polysiloxane | Hydrophobization | 1.0 |
| Potassium water glass | Binder | 20.0 |
| Photocatalytic titanium dioxide | Pigment | 5.0 |
| Titanium dioxide | White pigment | 12.0 |
| Kaolin | Filler | 1.0 |
| Diatomaceous earth, silicates, and silicon dioxide | Filler | 12.0 |
| Barium sulfate | Filler | 20.0 |

-continued

| | | |
|---|---|---|
| Solvent | Film formation agent | 0.6 |
| Styrene/acrylate | Binder | 4.0 |
| Siloxane | Anti-foaming agent | 0.2 |

EXAMPLE 9

Silicone Plaster for Exterior Applications

| | | |
|---|---|---|
| Water | — | 11.8 |
| Isothiazoninones | Microbiocide | 0.8 |
| Saccharide | Thickening agent | 0.1 |
| Sodium salt | Dispersing agent | 0.1 |
| Silicone resin emulsion | Binder | 2.0 |
| Photocatalytic titanium dioxide | Pigment | 5.0 |
| Titanium dioxide | White pigment | 1.6 |
| Diatomaceous earth, silicates, and silicon dioxide | Filler | 3.8 |
| Aluminum hydroxide | Filler | 8.8 |
| Cellulose | Filler | 0.7 |
| Calcium carbonate | Filler | 10.6 |
| Solvent | Film formation agent | 0.8 |
| Styrene/acrylate | Binder | 6.0 |
| Ethylene vinyl ester terpolymer | Binder | 5.5 |
| Tetra potassium pyrophosphate | Dispersing agent | 0.3 |
| Mineral oil | Anti-foaming agent | 0.1 |
| Calcium carbonate | Structure sand | 42.0 |

EXAMPLE 10

Silicate Plaster for Exterior Applications

| | | |
|---|---|---|
| Water | — | 7.2 |
| Polysaccharide | Thickening agent | 0.1 |
| Tetra alkyl alkylene diamine | Stabilizer for water glass | 0.3 |
| Potassium water glass | Binder | 4.1 |
| Potassium methyl siliconate | Hydrophobization | 0.3 |
| Photocatalytic titanium dioxide | Pigment | 5.0 |
| Titanium dioxide | White pigment | 1.8 |
| Diatomaceous earth and silicates | Filler | 2.8 |
| Calcium carbonate | Filler | 32.0 |
| Polyacryl nitrile | Filler | 0.3 |
| Mineral fiber | Filler | 0.5 |
| Styrene/acrylate | Binder | 8.3 |
| Solvent | Film formation agent | 0.2 |
| Isothiazolinones | Microbiocide | 0.3 |
| Fatty alcohol suspension | Drying retarder | 0.5 |
| Silicic acid | Delustering agent | 1.3 |
| Calcium carbonate | Structural sand | 35.0 |

EXAMPLE 11

Dispersion Varnish for Exterior Applications

| | | |
|---|---|---|
| Water | — | 14.0 |
| Anionic salts | Dispersing agent | 0.2 |
| Mineral oil | Anti-foaming agent | 0.3 |
| Solvent | Film formation agent | 5.0 |
| Photocatalytic titanium dioxide | Pigment | 5.0 |

-continued

| | | |
|---|---|---|
| Titanium dioxide | White pigment | 20.0 |
| Silicates | Filler | 3.0 |
| Pure acrylate | Binder | 50.0 |
| Potassium hydroxide | pH regulator | 0.2 |
| Acrylic acid | Thickening agent | 2.0 |
| Isothiazolinones | Microbiocide | 0.3 |

EXAMPLE 12

Concrete Glaze for Exterior Applications

| | | |
|---|---|---|
| Water | — | 23.0 |
| Anionic salts | Dispersing agent | 0.5 |
| Cellulose ether | Thickening agent | 0.2 |
| Mineral oil | Anti-foaming agent | 0.3 |
| Photocatalytic titanium dioxide | Pigment | 5.0 |
| Titanium dioxide | White pigment | 1.5 |
| Diatomaceous earth | Filler | 2.0 |
| Calcium carbonate | Filler | 27.0 |
| Solvent | Film formation agent | 4.0 |
| Styrene/acrylate | Binder | 35.0 |
| Acrylic acid | Thickening agent | 1.0 |
| Isothiazolinones | Microbiocide | 0.5 |

EXAMPLE 13

Lime Plaster for Exterior Applications

| | | |
|---|---|---|
| Water | — | 23.5 |
| Cellulose ether | Thickening agent | 0.2 |
| Caustic potash | pH regulator | 0.1 |
| Mineral oil | Anti-foaming agent | 0.1 |
| Salt of polyacrylic acid | Dispersing agent | 0.4 |
| Cellulose fiber | Filler | 1.0 |
| Titanium dioxide | White pigment | 3.0 |
| Calcium hydroxide (lime) | Binder | 8.0 |
| Vinyl chloride ethylene vinyl ester | Binder | 2.9 |
| Photocatalytic titanium dioxide | Pigment | 5.0 |
| Linseed oil stand oil | Binder | 0.4 |
| Silicates | Filler | 2.0 |
| Silica sand | Filler | 13.4 |
| Calcium carbonate | Structural sand | 40.0 |

EXAMPLE 14

Lime Plaster for Interior Applications

| | | |
|---|---|---|
| Water | — | 23.5 |
| Cellulose ether | Thickening agent | 0.2 |
| Caustic potash | pH regulator | 0.1 |
| Mineral oil | Anti-foaming agent | 0.1 |
| Salt of polyacrylic acid | Dispersing agent | 0.4 |
| Cellulose fiber | Filler | 1.0 |
| Titanium dioxide | White pigment | 3.0 |
| Calcium hydroxide (lime) | Binder | 8.0 |
| Vinyl chloride ethylene vinyl ester | Binder | 2.9 |
| Photocatalytic titanium dioxide | Pigment | 10.0 |

-continued

| Linseed oil stand oil | Binder | 0.4 |
| Silicates | Filler | 2.0 |
| Silica sand | Filler | 13.4 |
| Calcium carbonate | Structural sand | 35.0 |

EXAMPLE 15

Cement Plaster for Exterior Applications

| Marble powder | Filler | 24.0 |
| Calcium carbonate | Structural sand | 33.0 |
| Calcium carbonate | Filler | 4.0 |
| Silica sand | Filler | 12.0 |
| Fiber | Filler | 0.5 |
| Cellulose ether | Thickening agent | 0.3 |
| Silicates | Filler | 0.5 |
| Calcium sulfate | Filler | 0.2 |
| Photocatalytic titanium dioxide | Pigment | 5.0 |
| Oleate | Hydrophobization | 0.3 |
| White cement | Binder | 13.2 |
| Calcium hydroxide | Binder | 7.0 |

EXAMPLE 16

Cement Plaster for Interior Applications

| Marble powder | Filler | 24.0 |
| Calcium carbonate | Structural sand | 28.0 |
| Calcium carbonate | Filler | 4.0 |
| Silica sand | Filler | 12.0 |
| Fiber | Filler | 0.5 |
| Cellulose ether | Thickening agent | 0.3 |
| Silicates | Filler | 0.5 |
| Calcium sulfate | Filler | 0.2 |
| Photocatalytic titanium dioxide | Pigment | 10.0 |
| Oleate | Hydrophobization | 0.3 |
| White cement | Binder | 13.2 |
| Calcium hydroxide | Binder | 7.0 |

EXAMPLE 17

Gypsum Plaster for Interior Applications

| Gypsum (calcium sulfate) | Binder | 24.0 |
| Rock powder (e.g. marble powder) | Filler | 29.6 |
| Cellulose/starch - ether | Thickening agent | 0.3 |
| Photocatalytic titanium dioxide | Pigment | 10.0 |
| Calcium carbonate | Structural sand | 35.0 |
| Styrene/acrylate | Binder | 1.0 |
| Tartaric acid | Retarder | 0.1 |

EXAMPLE 18

Gypsum/Lime Plaster for Interior Applications

| Gypsum (calcium sulfate) | Binder | 4.0 |
| White lime hydrate | Binder | 10.0 |
| Rock powder (e.g. marble powder) | Filler | 28.7 |
| Cellulose/starch - ether | Thickening agent | 0.7 |
| Photocatalytic titanium dioxide | Pigment | 10.0 |
| Calcium carbonate | Structural sand | 45.0 |
| Styrene/acrylate | Binder | 1.5 |
| Tartaric acid | Retarder | 0.1 |

Compositions in accordance with various embodiments of the invention may comprise any one or more of various types of coating materials. For example, in various embodiments, a coating composition may comprise any one or more of a paint, a plaster, a varnish, and a glaze. Embodiments of coating compositions may be used on new and old construction subsurfaces in interior and exterior applications, including, for example, masonry, plaster surfaces, paintwork, wallpaper, wood, metal, glass, ceramic, thermal insulation composite systems, installed facade elements, and the like.

Embodiments of photocatalytically-active substances suitable for use in various embodiments of coating compositions will now be explained in detail in terms of a photocatalytically-active substance comprising a vlp-$TiO_2$, In preferred embodiments, a vlp-$TiO_2$ may exhibit an increased photocatalytical effectiveness. For exemplary purposes, the degradation of 4-chlorophenol by a defined amount of vlp-$TiO_2$ given exposure for 120 minutes to light having a wavelength $\geq 455$ nm serves as the measure of photocatalytic effectiveness (referred to as "photoactivity" in the following). An exemplary measuring method is described in detail below. Under the above-mentioned measuring conditions, the photoactivity of the exemplary vlp-$TiO_2$ may be at least 20%, preferably at least 40%, and especially preferably at least 50%.

In embodiments, a photocatalytically-active substance may include sulfur and/or carbon in the range of 0.05 to 4 percent by weight in relation to $TiO_2$, preferably 0.05 to 2.0 percent by weight, and especially preferably 0.3 to 1.5 percent by weight. In certain preferred embodiments, a photocatalytically-active substance comprises carbon in the range of 0.4 to 0.8 percent by weight.

The titanium dioxide particles may contain carbon only in a surface layer and these embodiments may be referred to as "carbon-modified" in the following discussion—in contrast to the volume-doted titanium dioxide prepared as per Sakthivel & Kisch (2003). The carbon or the carbon compounds of the vlp-$TiO_2$ may be bonded primarily covalently via oxygen on the $TiO_2$ surface and may be capable of being leached with alkalines.

Additionally or alternatively, the photocatalytically-active substance may include nitrogen and/or sulfur.

In contrast to unmodified $TiO_2$, the vlp-$TiO_2$ suitable for use in various embodiments of coating compositions may absorb visible light having a wavelength $(\lambda) \geq 400$ nm. In various embodiments and as shown in FIG. 1, the Kubelka-Munk function F ($R_{\infty}$) (arbitrary units) proportional to the absorbance for unmodified $TiO_2$ and for $TiO_2$ modified with C (vlp-$TiO_2$) as a function of the wavelength may be approximately 50% of the value at 500 nm and approximately 20% of the value at 400 nm.

Figure 2:
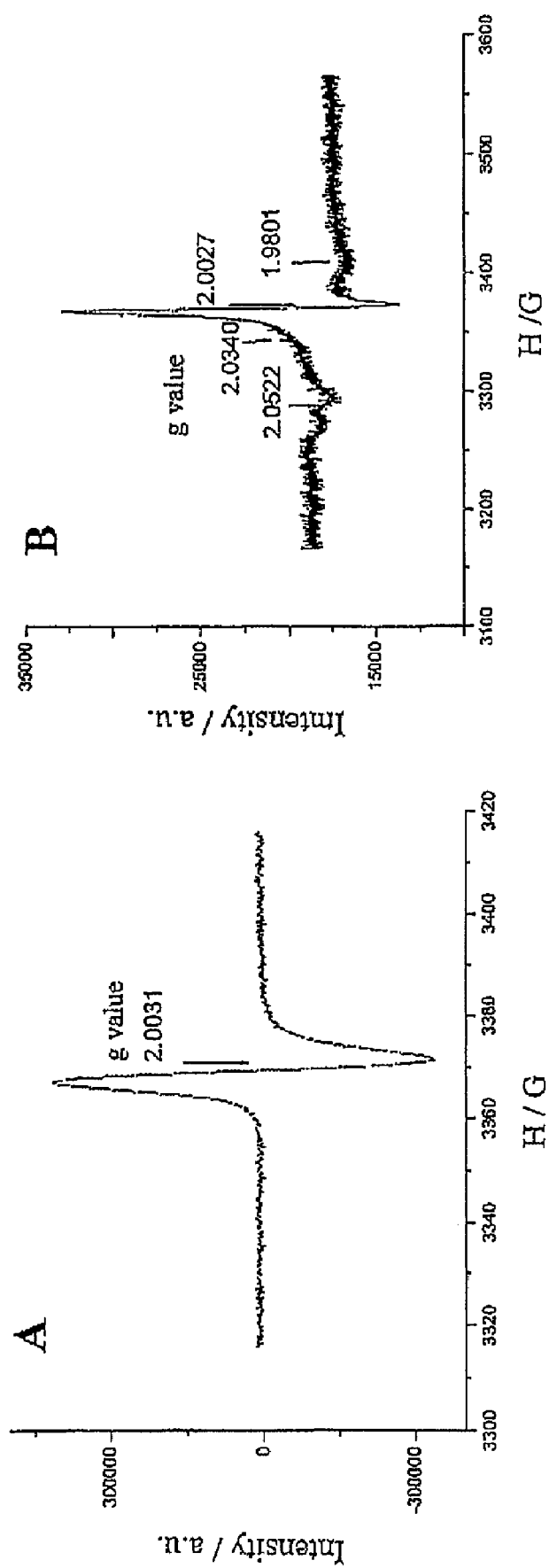
FIG. 2 shows an electron resonance spectra (ESR) of a vlp-$TiO_2$ (spectrum A) suitable for use in accordance with various embodiments of the invention and a $TiO_2$ (spectrum B) produced as per Sakthivel & Kisch, captured in the dark and at a temperature of 5 K.

FIG. 2 shows, in accordance with various embodiments, electron spin resonance (ESR) spectra of the vlp-TiO$_2$ (spectrum A) and the TiO$_2$ (spectrum B) produced as per Sakthivel & Kisch, measured in the dark and at a temperature of 5 K. As shown, spectrum A shows only a significant signal with a g value of 2.000. Spectrum B shows, in addition to a primary signal, three further signals in the range of the g values 1.97 to 2.05. In embodiments and as shown, a strong signal may result with a g value of 2.002 to 2.004, and in preferred embodiments, a g value of 2.003. In embodiments, in the g value range of 1.97 to 2.05, no further signals may be observed. The intensity of the signal at g=approximately 2.003 may increase by exposure to light having a wavelength ($\lambda$)$\geq$380 nm (UV-free 100 W halogen lamp, cold light filter KG5) as opposed to measurement in the dark.

Figure 3:
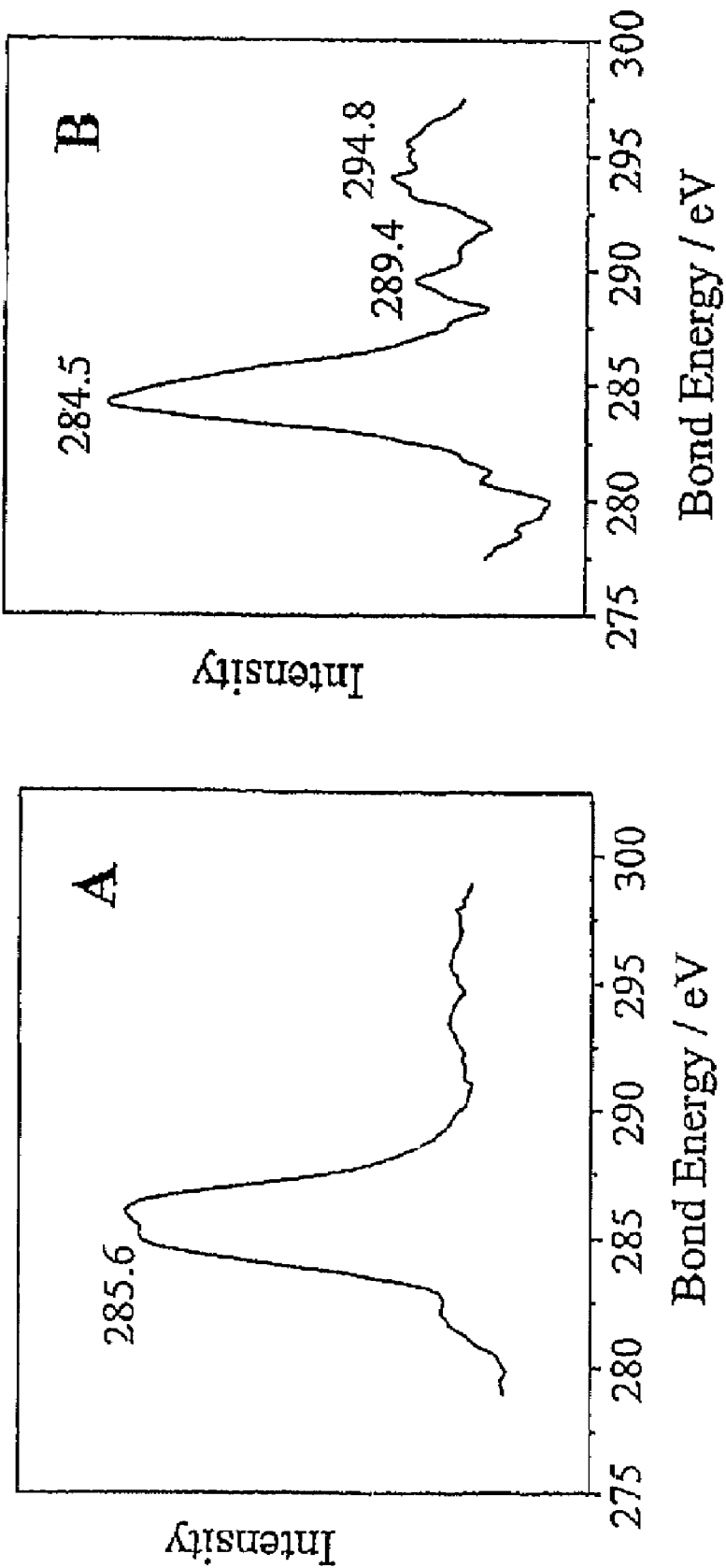
FIG. 3 shows an X-ray photoelectron spectra (XPS) of a vlp-$TiO_2$ (spectrum A) in accordance with various embodiments of the invention and $TiO_2$ precipitated from titanium tetrachloride with tetrabutyl ammonium hydroxide as per Sakthivel & Kisch (spectrum B)

In embodiments and as shown in FIG. 3, X-ray photoelectron spectroscopy (XPS) of the vlp-TiO$_2$ may be characterized by the occurrence of a strong absorption band (C1s signal) given a bond energy of 285.6 eV relative to the O1s band at 530 eV (spectrum A), which is an indication of elementary carbon.

Still referring to FIG. 3, spectrum B, on the other hand, shows C1s signals for elementary carbon at a bond energy of 284.5 eV as well as, additionally, bands at 289.4 eV and 294.8 eV, which are an indication of carbonate. The respective IR spectra also exhibit typical carbonate bands at 1738, 1096 and 798 cm$^{-1}$. In contrast to the photocatalyzer based on Sakthivel & Kisch (2003), embodiments of the vlp-TiO$_2$ may not show carbonate bands either in the X-ray photoelectron spectrum (XPS) or the infrared spectrum.

Under exposure to visible light, embodiments of the vlp-TiO$_2$ may exhibit a water contact angle of about 8°. Unmodified TiO$_2$, on the other hand, may exhibit a contact angle of about 21°.

Figure 4:
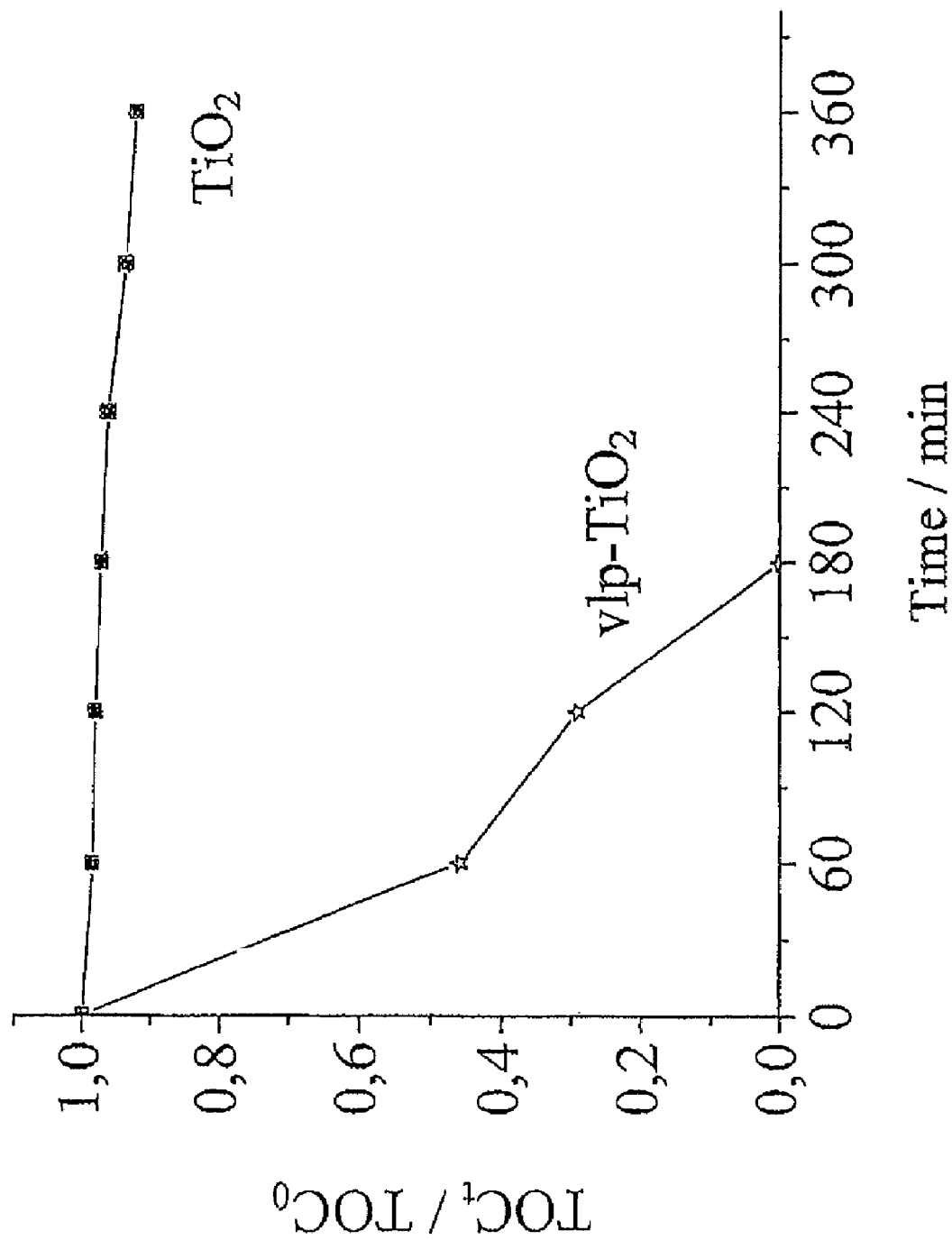
FIG. 4 illustrates the photocatalytical effectiveness of an embodiment of vlp-$TiO_2$ in contrast to unmodified $TiO_2$ in the degradation of 4-chlorophenol (as $2.5 \times 10 \text{ cm}^{-4}$ molar aqueous solution) by artificial visible light ($\lambda \geq 455$ nm), in accordance with various embodiments.

Shown in FIG. 4 is the photocatalytical effectiveness of embodiments of vlp-TiO$_2$ in contrast to unmodified TiO$_2$ in the degradation of 4-chlorophenol (as 2.5×10 cm$^{-4}$ molar aqueous solution) by artificial visible light ($\lambda$$\geq$455 nm). As shown, the total content of organic carbon (TOC$_t$) in the solution decreases in relation to the starting value (TOC$_0$). With the vlp-TiO$_2$, the complete degradation takes place after about three hours.

In embodiments, the photocatalytically-active substance may enable the degradation of pollutants not only by artificial visible light, but also by diffuse daylight in interior spaces. The photocatalytically-active substance may be used to decompose contaminants in the air which come into contact with the coating composition in accordance with embodiments of the invention.

Figure 5:
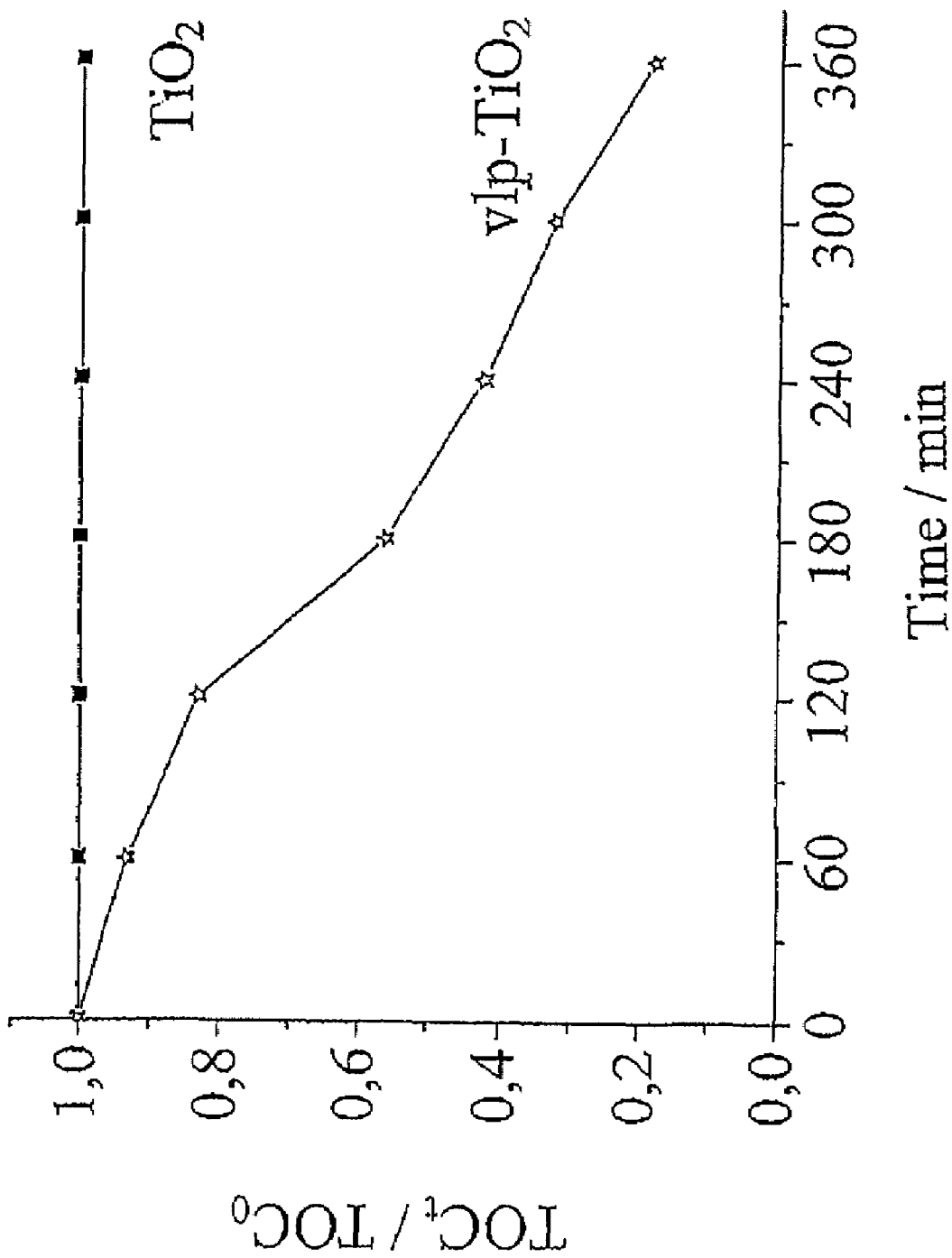
FIG. 5 illustrates the photocatalytical effectiveness of an embodiment of vlp-$TiO_2$ in contrast to unmodified $TiO_2$ in the degradation of 4-chlorophenol (as $2.5 \times 10 \text{ cm}^{-4}$ molar aqueous solution) by diffuse daylight of an interior space, in accordance with various embodiments.

FIG. 5 illustrates the photocatalytical effectiveness of embodiments of vlp-TiO$_2$ in contrast to unmodified TiO$_2$ in the degradation of 4-chlorophenol (as 2.5×10 cm-4 molar aqueous solution) by diffuse daylight of an interior space. As shown, the total content of organic carbon (TOC$_t$) in the solution decreases in relation to the starting value (TOC$_0$). In embodiments, even under low-intensity diffuse daylight (7 to 10 W/m$^2$ in the range of 400 to 1200 nm), the vlp-TiO$_2$ effects a degradation of 80% within 6 hours. Even under very low-intensity diffuse daylight lighting (1.6 to <1 W/m$^2$), the vlp-TiO$_2$ may still show significant photoactivity in contrast to the commercially-available TiO$_2$ photocatalyzers (for example, Degussa P25, Kemira UV Titan, Sachtleben Hombikat, Tayca MT-100SA). The measurement of the degradation rate of 2.5×10$^{-4}$ molar 4-chlorophenol solution was performed as described below.

a) Light intensity: 1.6 W/m$^2$; duration: 12 h

| Catalyzer | BET Surface | Degradation Rate |
|---|---|---|
| vlp-TiO$_2$ | 170 m$^2$/g | 16% |
| P25 | 50 m$^2$/g | 4% |
| UV Titan | 20 m$^2$/g | 5% |
| Hombikat | 240 m$^2$/g | 9% |
| MT-100SA | 50 m$^2$/g | 5% | b) Light intensity: <1 W/m$^2$; duration: 24 h

| Catalyzer | BET Surface | Degradation Rate |
|---|---|---|
| vlp-TiO$_2$ | 170 m$^2$/g | 18% |
| Hombikat | 240 m$^2$/g | 3% |

Figure 6:
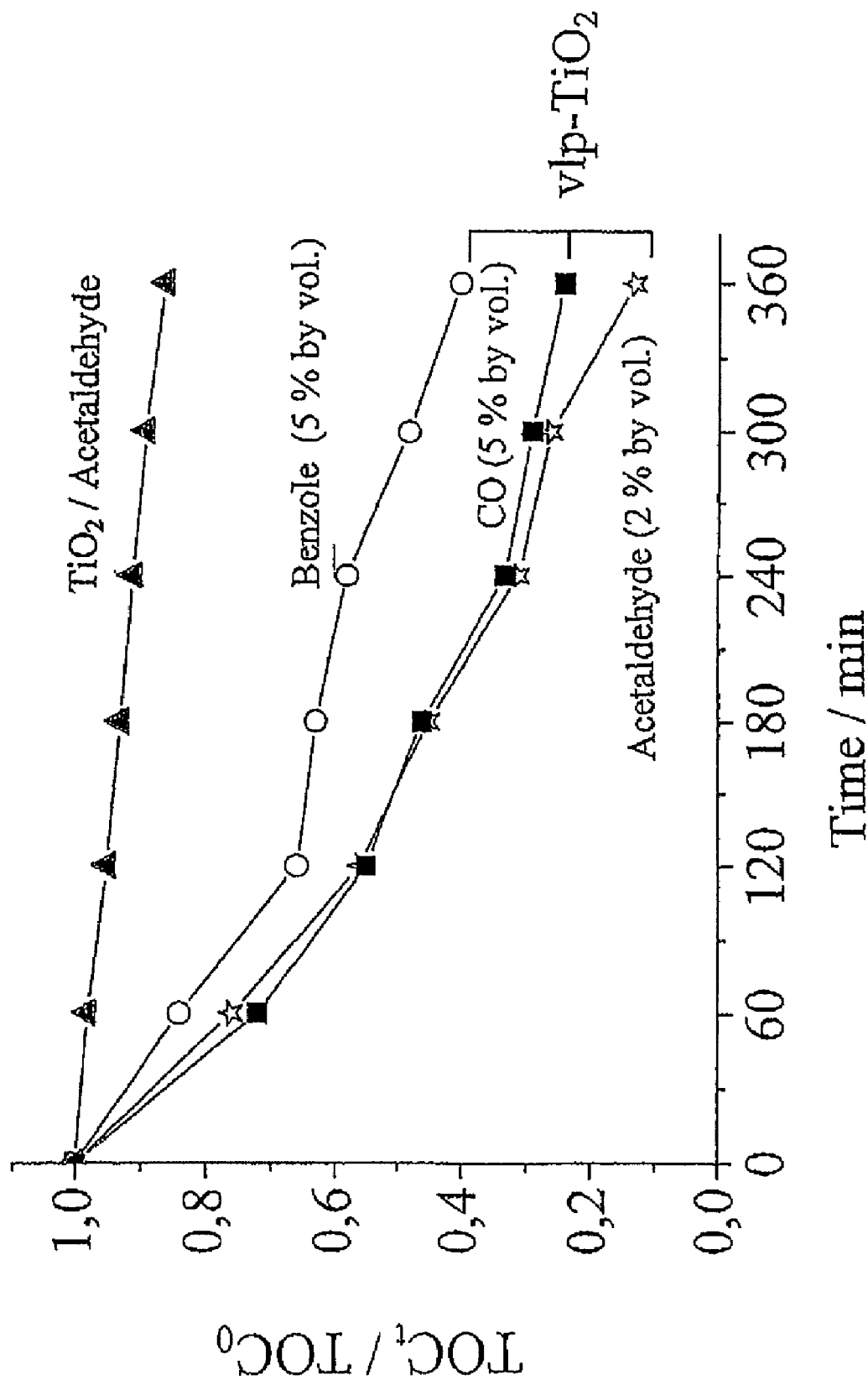
FIG. 6 illustrates the photocatalytical effectiveness of an embodiment of vlp-$TiO_2$ as opposed to unmodified $TiO_2$ in the degradation of benzene (5 percent by volume), acetaldehyde (2 percent by volume) and carbon monoxide (5 percent by volume) by diffuse daylight of an interior space, in accordance with various embodiments.

FIG. 6 illustrates the photocatalytical effectiveness of embodiments of vlp-TiO$_2$ as opposed to unmodified TiO$_2$ in the degradation of benzene (5 percent by volume), acetaldehyde (2 percent by volume) and carbon monoxide (5 percent by volume) by the diffuse daylight of an interior space. The illustrated analysis was performed using a 1-liter round bottomed flask reaction container, equipped with a paper round filter coated with 12 mg titanium dioxide (d=15 cm). As shown, the total content of organic carbon (TOC$_t$) in the atmosphere decreases in relation to the starting value (TOC$_0$). In accordance with various embodiments of the invention and as shown, the degradation of benzene, acetaldehyde, or carbon monoxide by the vlp-TiO$_2$ may occur as well as the degradation of acetaldehyde by unmodified titanium dioxide.

Figure 7:
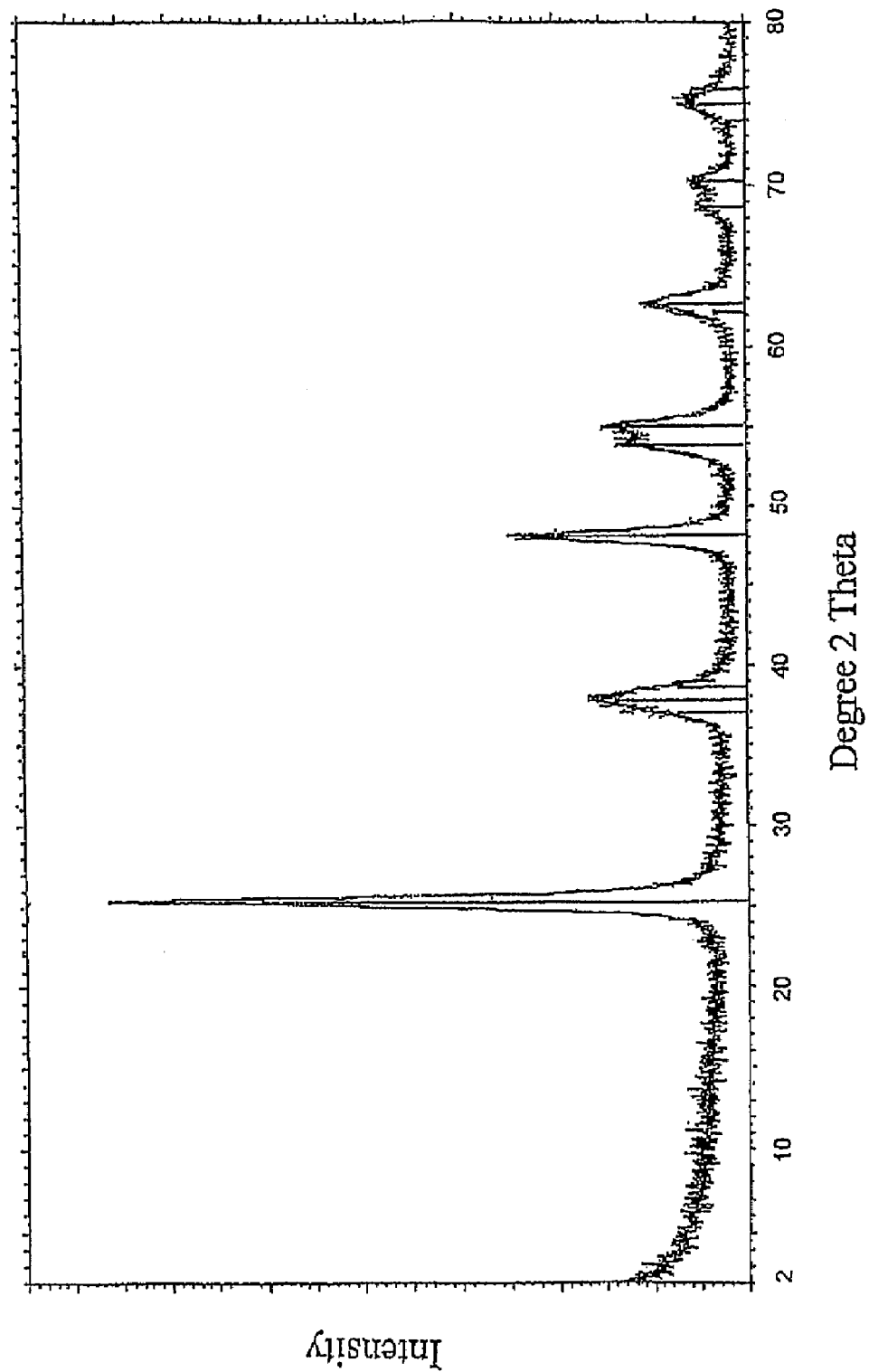
FIG. 7 shows an X-ray powder diffractogram of an embodiment of vlp-$TiO_2$, in accordance with various embodiments.

FIG. 7 shows an X-ray powder diffractogram of an embodiment of vlp-TiO$_2$, which as shown only exhibits anatase reflexes. For the embodiment, the crystallite size calculated according to the Scherrer method is about 10 nm.

Figure 8:
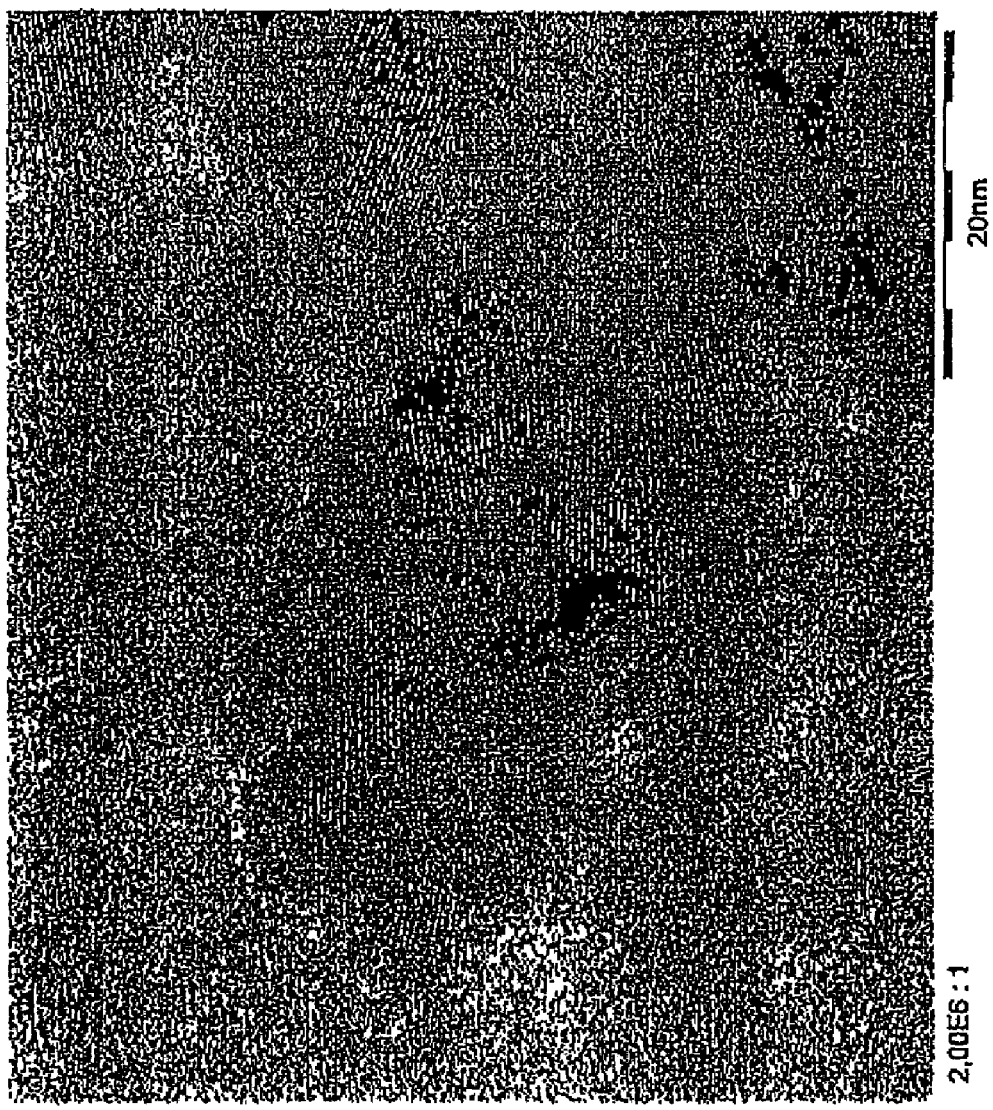
FIG. 8 shows an image produced via high-resolution transmission electron microscopy (HTEM) with the grid lines of an embodiment of vlp-$TiO_2$ crystallites, in accordance with various embodiments.

FIG. 8 shows an image produced via high-resolution transmission electron microscopy (HTEM) with the grid lines of embodiments of the crystallites. For the embodiment, the crystallite size can be estimated to the order of about 10 nm.

Figure 9:
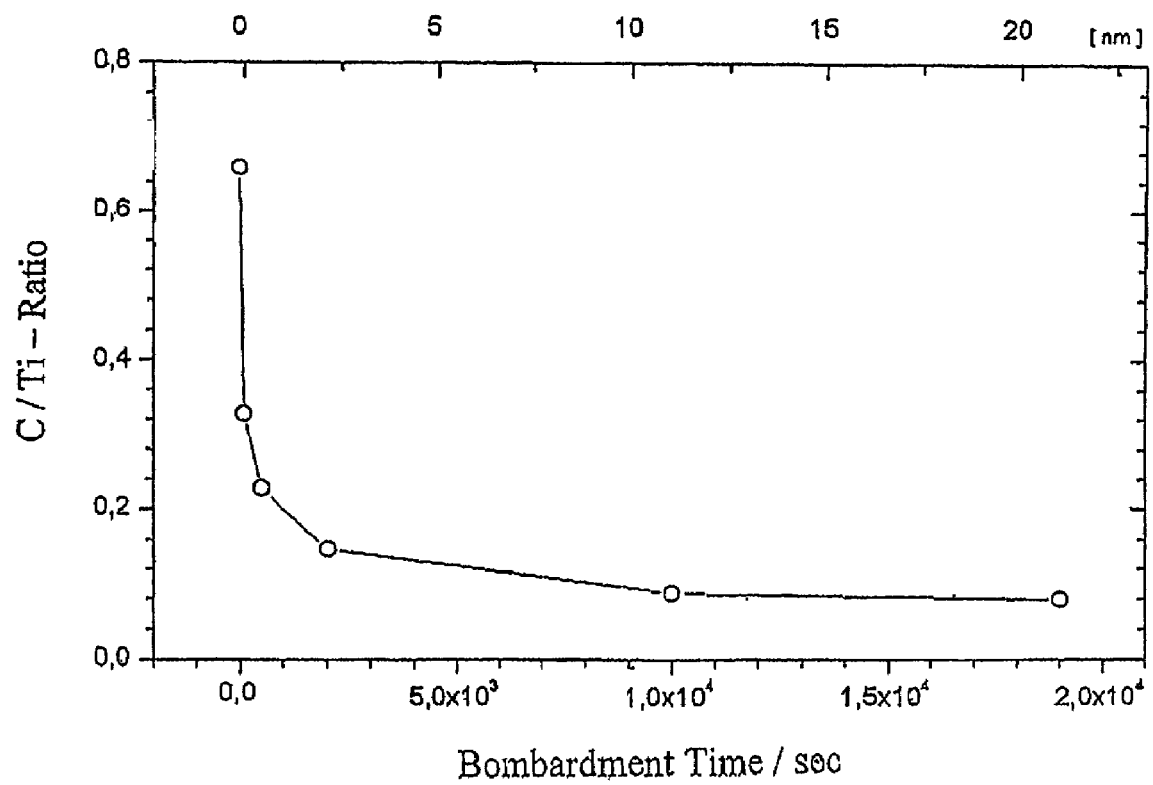
FIG. 9 shows a carbon depth profile of an embodiment of vlp-$TiO_2$, in accordance with various embodiments.

FIG. 9 shows a carbon depth profile of an embodiment of vlp-TiO$_2$, represented as C/Ti ratio. For the embodiment, ion bombardment (Ar+) and ESCA analysis was enlisted. As shown, a bombardment time of approximately 5×10$^3$ seconds is equivalent to a depth of approximately 5 nm.

Figure 12:
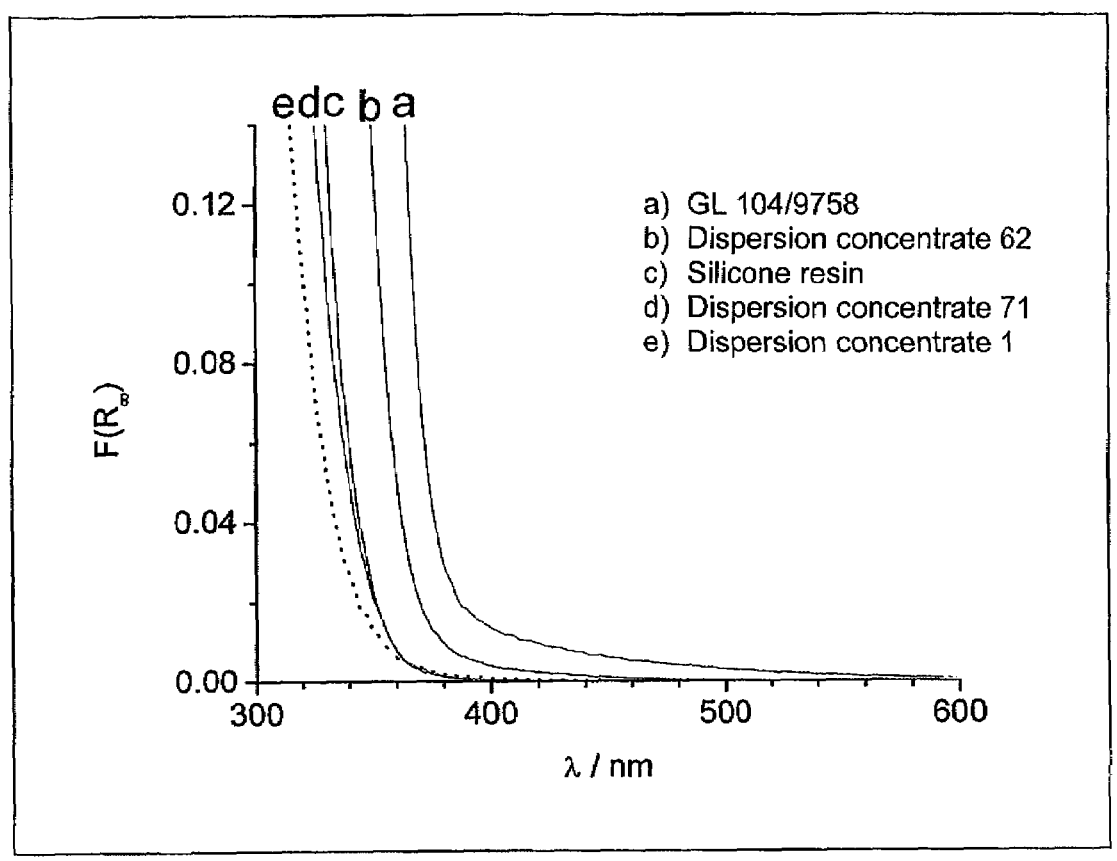
FIG. 12 shows the Kubelka-Munk functions of embodiments of coating compositions including various binders in comparison to the Kubelka-Munk function of an embodiment of a photocatalyticallyactive substance, in accordance with various embodiments.

FIG. 12 shows the Kubelka-Munk functions of an embodiment of a coating composition including various binders in comparison to the Kubelka-Munk function of an embodiment of the photocatalytically-active substance.

The photocatalytically-active substance may be used in coatings in any one or more interior and/or exterior applications, including, for example, paints, plasters, varnishes, and glazes; for the application on, for example, masonry, plaster surfaces, paintwork, wallpaper, wood, metal, glass, ceramic, on building components such as, for example, thermal insulation composite systems, installed facade elements, street pavings, plastics, plastic foils, fibers, and paper.

In embodiments, the photocatalytically-active substance may be used in the production of any one or more of, for example, prefabricated concrete parts, concrete paving stones, roof tiles, ceramic, tiles, wallpaper, fabrics, panels and facing elements for ceilings and walls in interior and exterior applications.

Further applications in the construction industry and similar industries may result from the light-induced increase in hydrophilia of the $TiO_2$ surface.

Exemplary Embodiments of Synthesis of Coating Compositions

As discussed previously, embodiments of photocatalytically active substances suitable for use in accordance with the invention may include a titanium compound. The titanium compound may be in the form of an amorphous form, a partially crystalline form, a crystalline titanium oxide form, an aqueous titanium oxide form, a titanium hydrate form, and/or a titanium oxyhydrate form. Any one or more of the forms may be referred to in the following embodiments as starting titanium compound.

In embodiments of titanium dioxide production, the starting titanium compound may, for example, be produced using a selected one of the sulfate method or the chloride method. Titanium hydrate or titanium oxyhydrate or metatitanic acid may be precipitated, for example, in the hydrolysis of titanyl sulfate or titanyl chloride.

In embodiments, the starting titanium compound may be available as a finely grained solid or in suspension with a respective solid fraction of at least 15 percent by weight, with the specific surface of the solid measuring at least 50 $m^2/g$ as per BET, preferably about 150 to 350 $m^2/g$ as per BET, and especially preferably about 150 to 250 $m^2/g$ as per BET.

For the industrial implementation of the process, titanium hydrate from the sulfate process may be preferred as the starting titanium compound for economic reasons. Any adhering sulfuric acid may be advantageously first removed from the titanium hydrate, using, for example, neutralization and washing, so that the sulfate fraction of the solid is <1 percent by weight, calculated as $SO_3$, after drying.

A carbon-containing substance especially advantageously suitable for use in the production of exemplary embodiments of photocatalytically-active substances has a degradation temperature of no more than 400° C., preferably no more than 300° C. Carbon-containing substances such as, for example, wood, carbon black, or activated charcoal, and especially organic carbon compounds such as hydrocarbons having at least one functional group may be suitable. In embodiments, the functional group may be any one or more of: OH; CHO; COOH; $NH_x$; $SH_x$, and COOR, wherein R is an alkyl or aryl residue. For example, succinic acid, glycerin or ethylene glycol may be possible. Sugar and other carbohydrates as well as organoammonium hydroxide, especially tetra alkyl ammonium, may also be used. Also suitable are mixtures of the above-mentioned compounds. Preferably, water-soluble polyalcohols having a carbon-oxygen ratio of ca. 0.7 to 1.5, preferably about 1, may be used. In one embodiment, the water-soluble polyalcohol is pentaerythrite. The carbon compound may be used as solid, solution, or suspension.

In certain preferred embodiments, the organic carbon compound has a maximally high affinity towards the surface of the starting titanium compound in order to be capable of forming a close bond with it.

In embodiments, the starting titanium compound is intimately mixed with the organic carbon compound in such a way that a surface coating of the starting titanium compound with the carbon compound takes place. The organic carbon compound may be present in physisorbed or chemisorbed form on the surface of the starting titanium compound. The coating of the surface of the starting titanium compound may be effected by dissolution of the carbon compound in the suspension of the starting titanium compound or by mixing the suspension of the carbon compound with the suspension of the starting titanium compound.

Intensive mixing of the carbon compound with a previously dried starting titanium compound in powder form may also be possible in various embodiments. Alternatively, in some embodiments wherein titanium hydrate is used, the carbon compound may also be admixed to the solution to be hydrolyzed as early as in the production step of the titanium hydrate. In the finished mixture of starting titanium compound and carbon compound, the amount of the carbon compound relative to the starting titanium compound (as solid) is about 1 to 40 percent by weight.

In embodiments wherein the finished mixture is a suspension, it may be dried to form a powdery solid prior to further processing. In exemplary ones of these embodiments, known processes such as spray drying or fluid bed drying may be suitable.

The finished and, as the case may be, predried mixture may be thermally treated at temperatures of no more than 400° C. In embodiments, the thermal treatment is performed in an oxidizing atmosphere, preferably air or an oxygen-air mixture. In embodiments of the process, the organic carbon compound is degraded on the surface of the starting titanium compound and the $H_2O$, $CO_2$, and CO is released. Although the thermal treatment may be performed in the discontinuous batch mode, for example in a commercially available lab oven, a continuous process, allowing for a specific temperature profile to be run, may be preferred for economic reasons. Any one or more of various embodiments of methods for making coating compositions, particularly those including an operation of allowing the implementation of a respective temperature profile and the necessary retention time, may be performed as continuous operations. Indirectly and directly heated rotary ovens may be especially suited units. But it may also be possible to use continuously operated fluidized bed reactors, fluid bed driers, and/or heated ploughshare mixers. The three last-mentioned units may also be operated in discontinuous mode in various embodiments.

In various embodiments, the thermal treatment is preferably performed such that a product (vlp-$TiO_2$) with a carbon content of 0.05 to 4.0 percent by weight, preferably about 0.05 to 2.0 percent by weight, especially preferably about 0.3 to 1.5 percent by weight may be obtained. In certain preferred embodiments, a product (vlp-$TiO_2$) with a carbon content of about 0.4 to 0.8 percent by weight may be obtained. In the course of the thermal treatment, a color change from white to brown and finally beige may occur. In various embodiments, the end product may be characterized by a beige to slightly yellowish-brownish coloration. In embodiments, the end product may be characterized in that the carbon is detectable in amorphous and polycrystalline areas of the surface of the surface layer as well as on the surface itself. In various embodiments, the product is photoactive in visible light.

In embodiments, following the thermal treatment operation(s), the product may be deagglomerated using any one or more of known processes, including, for example, in a pin mill, jet mill, and counter jet mill. In the case of predried mixtures in powder form, the thermal treatment for the most part may result in agglomerate-free products that do not require further milling. In embodiments, the grain fineness to be achieved is dependent, at least in part, on the grain size of the starting titanium compound. The grain fineness or specific surface of the product may be just slightly lower, but in the same order of magnitude as that of the educt. The desired grain fineness of the photocatalyzer may be dependent, at least in part, on the field of use of the photocatalytically-active substance. Although it is usually in a similar range as that of the $TiO_2$ pigments, in embodiments it may also be above or below it. In various embodiments, the specific surface as per BET is about 100 to 250 $m^2/g$, preferably about 130 to 200 $m^2/g$, and especially preferably about 130 to 170 $m^2/g$.

Exemplary embodiments of synthesis and measurement of photocatalytically-active substances and coating compositions incorporating such substances will now be described in more detail. These examples are intended for exemplary purposes only and thus are not intended to restrict the scope of the invention.

Synthesis Example 1

An aqueous titanium oxyhydrate paste (35 percent by weight solid), prepared using the sulfate method, is diluted with distilled water at room temperature to such a degree that a stirrable suspension is obtained. The solid fraction is approximately 20 to 25%. A sufficient amount of NaOH solution (36 percent by weight) is added until a pH value in the range of approximately 6.0 to 7.0 is obtained. Then the suspension is filtered and washed with distilled water until the $SO_3$ content, measured on the dried residue, is under approximately 1 percent by weight.

The titanium oxyhydrate neutralized and washed in this way is then diluted again with distilled water to form a stirrable suspension (approximately 25% solid) and approximately 12 percent by weight succinic acid, relative to the solid, is added. The succinic acid is added to the suspension as a solid and the suspension is stirred until the succinic acid is completely dissolved. The suspension is heated to approximately 60° C. to improve the solubility of the succinic acid.

The suspension prepared in this way is dried under a surface evaporator (for example, an IR radiator), while being stirred, until the suspension turns into a pasty mass. The pasty mass is then dried in a lab drying cabinet at approximately 150° C. until the solid fraction is greater than about 98%.

Three hundred grams (300 g) of the dried mixture of titanium oxyhydrate/succinic acid are finely ground (for example, by mortaring or sifting) and the powder thus obtained is placed, in a quartz dish with cover, in a lab oven at approximately 290° C. Approximately every 1 to 2 hours, the quartz dish is removed and the powder is again mixed. After approximately 13 to 15 hours in the lab oven, the color of the powder has changed from initially yellowish to grey-black to yellowish-brown. The thermal treatment resulting in the vlp-$TiO_2$ is completed when the carbon content has decreased from initially approximately 5 to 5.5 percent by weight to approximately 0.65 to 0.80 percent by weight.

Subsequently, the photocatalyzer is deagglomerated and analyzed for carbon content, optical properties, BET surface, and photoactivity.

Synthesis Example 2

Analogous procedure as in Example 1, except that approximately 12 percent by weight pentaerythrite is added to the titanium oxyhydrate suspension as a solid.

Synthesis Example 3

Analogous procedure as in Example 2, except that approximately 5 percent by weight pentaerythrite is added to the titanium oxyhydrate suspension as a solid.

Synthesis Example 4

A titanium oxyhydrate/pentaerythrite suspension is prepared, using approximately 5 percent by weight pentaerythrite, as described in Example 1. In variation from Example 1, the thermal treatment of the thus obtained suspension is performed in a continuously operated rotary oven as follows.

The rotary oven is operated in the reverse flow mode and heated directly via a gas burner. The open flame of the gas burner is protected by a flue, which prevents direct contact with the product (vlp-$TiO_2$). The heated oven length is approximately 7 m and the clear diameter is approximately 0.3 m. The suspension is finely sprayed into the feeder of the oven. The feed quantity of the suspension is approximately 40 kg/h. Chain fixtures in the feeder of the oven serve to ensure good swirling and hence rapid drying and subsequent crushing of the dried material. The processing time in the continuously operated rotary oven is approximately 1 hour. The oven temperature in the discharge area is controlled via the amount of gas on the burner to approximately 260° C. At the oven discharge, the vlp-$TiO_2$ presents as a fine powder with a yellowish-brown color. Then the vlp-$TiO_2$ is deagglomerated in a lab mixer (for example, Braun, MX 2050) and analyzed for carbon content, optical properties, BET surface, and photoactivity.

Synthesis Example 5

Analogous procedure as in Example 4, except that the oven temperature in the discharge area is controlled via the amount of gas on the burner to approximately 280° C.

Synthesis Example 6

A suspension of titanium oxyhydrate and pentaerythrite is prepared, using approximately 5 percent by weight pentaerythrite, as described in Example 1. In variation from Example 1, the suspension is predried in an electrically heated oven to form a solid in powder form with a residual moisture content of approximately 22%. The thermal treatment of the predried fed material in powder form is performed in a continuously operated, indirectly heated rotary oven as follows.

The rotary oven is operated in the cocurrent flow mode and electrically heated in three zones. The entire heated oven length is approximately 2700 mm and the clear diameter is approximately 390 mm. The solid in powder form is conveyed over a dosing screw feeder into the feeder of the oven.

Chain fixtures over the entire length of the rotating cylinder ensure a homogeneous distribution in the oven and prevent caking to the oven wall. The amount fed is approximately 25 kg solid per hour. The processing time through the continuously operated rotary oven is approximately 0.5 hours. The oven temperature is electrically controlled in three heating zones. The temperature of each of the three heating zones is individually controllable. At the oven discharge, the vlp-$TiO_2$ presents as beige-colored fine powder. Then the vlp-$TiO_2$ is deagglomerated in a lab mixer (for example, Braun, MX 2050) and analyzed for carbon content, optical properties, BET surface, and photoactivity.

Comparative Synthesis Example

As in Example 2, a $TiO_2$ pigment (anatase) with a BET surface of approximately 10 $m^2/g$ (for example, commercially-available product Kronos 1000) is mixed with approximately 12% pentaerythrite and is then thermally treated.

TABLE 1

| | | Thermal Treatment | | C content | Analytic of the vlp-TiO$_2$ PLV-Test | | | BET | Photoactivity Degradation of 4-CP in 120 |
|---|---|---|---|---|---|---|---|---|---|
| Example | Organic | °C. | Time (h) | (%) | L* | B* | A* | m$^2$/g | min. (%) |
| 1 | Succinic acid | 290 | 13 | 0.79 | 85.4 | 9.85 | 1.63 | 164 | 48 |
| 2 | Pentaerythrite | 290 | 28 | 0.75 | 86.9 | 10.08 | 1.53 | 158 | 50 |
| 3 | Pentaerythrite | 290 | 10 | 0.76 | 83.7 | 10.03 | 1.59 | 140 | 63 |
| 4 | Pentaerythrite | 260 * | 1 ** | 0.92 | 85.1 | 11.7 | 1.2 | 152 | 58 |
| 5 | Pentaerythrite | 280 * | 1 ** | 0.50 | 85.8 | 9.4 | 2.2 | 160 | 68 |
| 6 | Pentaerythrite | 300 *** | 0.5 ** | 0.78 | 83.0 | 11.0 | 2.6 | 167 | 86 |
| Counter-example | Pentaerythrite | 290 | 42 | 0.82 | 74.7 | 9.12 | 2.50 | 11.6 | <5 |

\* Max. temperature, measured at the discharge of the rotary oven
\*\* Processing time of the material fed through the rotary oven
\*\*\* Temperature of the three heating zones, measured in the area of the heating elements Table 1 provides a summary of the analytics and photoactivity of the vlp-TiO$_2$ suitable for use in various embodiments of the invention.

As shown in Table 1 (Examples 1 to 6), vlp-TiO$_2$ prepared from titanium hydrate shows an excellent photocatalytic effectiveness in the visible spectral range with good optical values (PLV test). The use of anatase pigment instead of titanium hydrate results in a product without appreciable photoactivity (example for comparison).

Synthesis Example 7

Approximately 5 g of titanium dioxide (for example, commercially-available product TRONOX Titanhydrat-0 [titanium hydrate] available from Kerr-McGee Pigments GmbH) is suspended at room temperature in approximately 20 ml distilled water; approximately 5 ml ethylene glycol (available from FLUKA AG) is added to the suspension and the suspension is treated in the ultrasound bath (for example, Sonorex Super RK 106 available from Bandelin Electronic, Berlin; 35 kHz, 120 W eff. Hf power). Following magnetic stirring over night, the solvent is removed, preferably in the vacuum; the residue is dried at approximately 100 to 200° C., preferably approximately 200° C., for at least 12 hours; subsequently, it is heated to approximately 300° C. in a closed vessel within one hour and then maintained at this temperature for another three hours. In this process, a color change of the powder from white to dark brown to beige is observed. Longer heating results in colorless, inactive powders. The elementary analysis of the product yields approximately 2.58 percent by weight carbon, approximately 0.02 percent by weight nitrogen and approximately 0.40 percent by weight hydrogen. Unmodified TiO$_2$ contains approximately 0.07 percent by weight [carbon] and approximately 0.0 percent by N and approximately 0.0 percent by weight H.

Synthesis Example 8

To strip the superficial carbon compound, approximately 5 g of vlp-TiO$_2$ is stirred overnight into approximately 100 ml of 2 M sodium hydroxide (pH 12). Centrifuging yields a brown-yellow extract and a barely colored white residue; the latter is dried at approximately 100° C. The powder thus obtained shows no activity during the degradation of 4-chlorophenol in the visible light. When the powder is reunited with the extract and slightly heated, preferably to approximately 200° C., it exhibits the same activity as the untreated (unleached) vlp-TiO$_2$ in the degradation reaction.

Synthesis Example 9

To coat a plastic foil, a powder prepared as in Example 6 is suspended in the ultrasound bath in a liquid such as methanol or ethanol and the resulting suspension is applied to the sheet as thinly as possible using a spray bottle. Following drying at approximately 343 K, the coating can be repeated up until the desired layer thickness is obtained.

Instead of the plastic foil, a different carrier, such as, for example, paper (cf. experiment as per FIG. 6) or aluminum ((cf. under test methods h), "dip coating," set forth below)) may be used.

Exemplary Methods of Measurement a) Determination of the Optical Values (PLV Test)

The method serves to determine the optical values for brightness L*, coloring a* and coloring b* of the vlp-TiO$_2$. A powder compact is prepared from the vlp-TiO$_2$ to be tested under defined conditions using a hydraulic small press of the company of MATRA, Frankfurt. Then the remission values are determined on the powder compact using the HUNTER-LAB Tristimulus Colorimeter.

The vlp-TiO$_2$ is ground prior to the preparation of the compact. To do this, approximately 100 g of the vlp-TiO$_2$ obtained is placed in a commercially available mixer (for example, Braun, model: MX 2050) and is mixed approximately 12 times for approximately 5 seconds. Between each grinding step, the mixer is opened and the powder is mixed again. A white sheet of paper, matte on both sides, is placed on the base plate having a circular depression, and then a metal ring (height approximately 4 cm, diameter approximately 2.4 cm) is pressed into the depression using the press approximately 25 g of the ground vlp-TiO$_2$ is fed into the metal ring under slight shaking and tapping. Using a pressure of approximately 2-3 kN, the powder is compressed.

The pressing process is repeated a second time until the target operating pressure of approximately 15 kN is reached. By carefully turning and pulling it, the metal ring is separated from the base plate. The paper between the base plate and the ring is removed. The compact is now in the ring and is used for the measuring procedure using the HUNTERLAB colorimeter. The measured values L*, a*, b* are read off directly on the colorimeter.

b) Determination of Photoactivity (Degradation of Pollutants)

Figure 10:
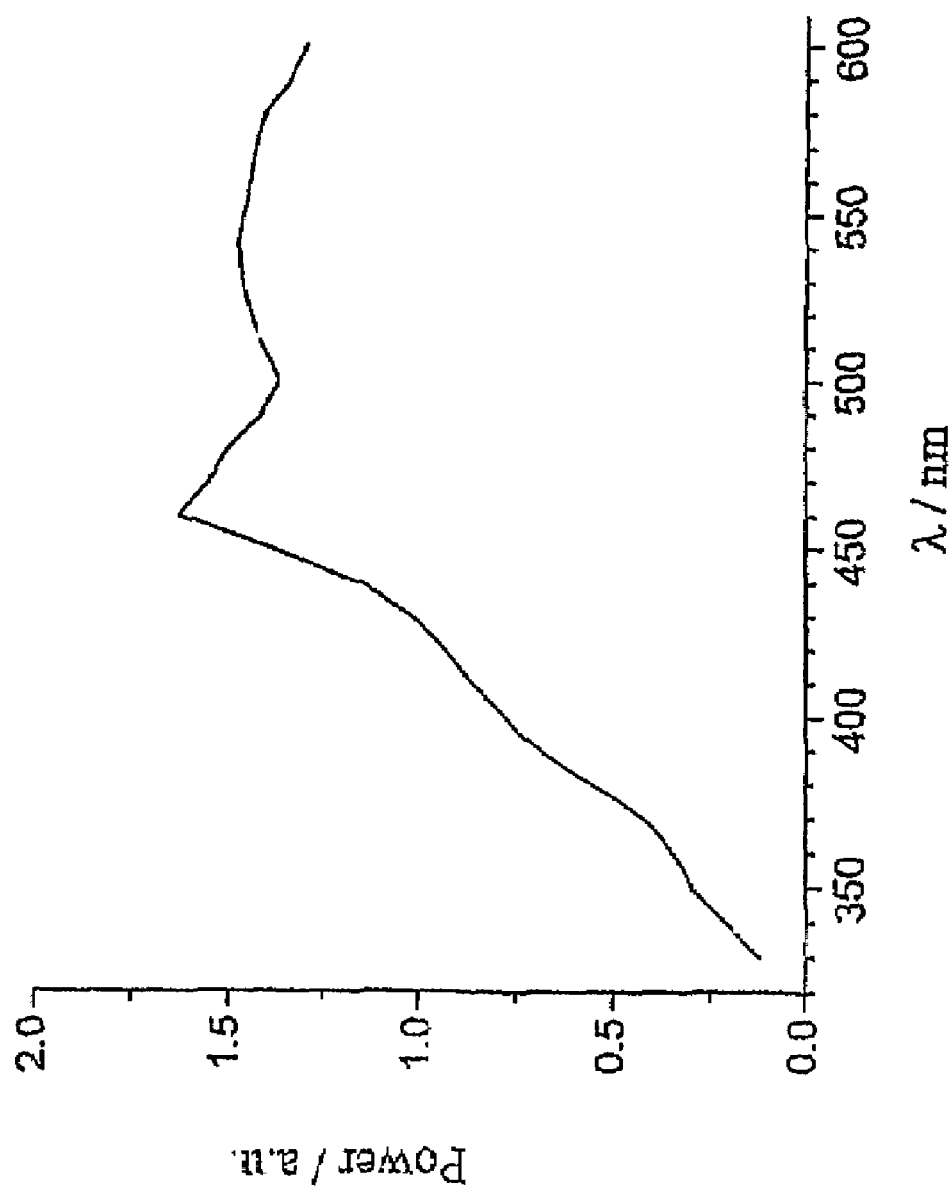
FIG. 10 illustrates a spectrum of a lamp for determination of photoactivity of a photocatalytically-active substance, in accordance with various embodiments.
Figure 11:
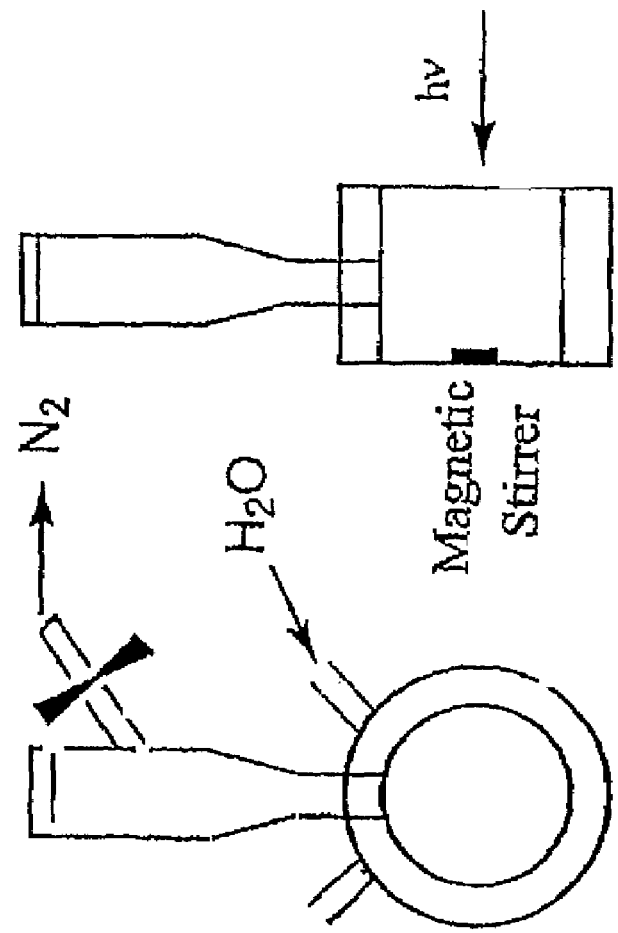
FIG. 11 illustrates a cuvette enlisting for determination of photoactivity of a photocatalytically-active substance, in accordance with various embodiments.

In Artificial Visible Light:

Approximately 15 mg of the vlp-$TiO_2$ is dispersed in approximately 15 ml of a $2.5 \times 10^{-4}$ molar solution of 4-chlorophenol for approximately 10 minutes in the ultrasound bath and then exposed to light on an optical bench in a water-cooled round cuvette. The exposures to light for the determination of the photoactivity are performed using an Osram XBO 150 W Xenon short arc lamp installed in a focusing lamp case (for example, AMKO Mod. A1020, focal length: 30 cm). The spectrum of this lamp is shown in FIG. 10. The reactions are performed in a water-cooled round cuvette with approximately 15 ml capacity and an inner diameter of approximately 30 mm and a layer thickness of approximately 20 mm. The reaction suspension may be stirred using a stirring motor and stirring magnet attached on the side. The round cuvette is depicted in FIG. 11. The cuvette is retained in the focal point of the lamp. The light is focused in such a way that only the reaction space of the cuvette is exposed. All components are firmly mounted on an optical bench. To eliminate UV light, a filter (for example, one available from Schoft) with a transmittance of $\lambda \geq 455$ is introduced into the path of the rays. In order to prevent possible heating of the reaction space from the light exposure, an IR filter is additionally mounted in the path of the rays. This is a cylinder filled with water (diameter approximately 6 cm, length approximately 10 cm).

The decrease in concentration of 4-chlorophenol is monitored using UV spectroscopy ($\lambda = 224$) or, in the case of degradation (oxygen), via measurement of the total content of organic carbon (TOC value).

In the Diffuse Daylight of an Interior Space:

Approximately 50 mg of the vlp-$TiO_2$ is dispersed in approximately 50 ml of a $2.5 \times 10^{-4}$ molar solution of 4-chlorophenol for 10 minutes in the ultrasound bath and then exposed to the daylight of an interior space in an Erlenmeyer flask (100 ml) while stirring.

Degradation of Acetaldehyde Gas, Benzene Vapor and Carbon Monoxide:

In a round flask (1 liter) filled with air-saturated acetaldehyde gas (approximately 2 percent by volume) or benzene vapor (approximately 5 percent by volume) or carbon monoxide, two round filters (paper, d=15 cm, 2 mg catalyzer per filter), coated on both sides with vlp-$TiO_2$, are introduced. Then the flask is exposed to the daylight in the lab and the decrease in pollutants and the formation of carbon monoxide is monitored using IR spectroscopy.

c) Determination of the Carbon Content

The determination is performed in terms of total organic carbon content (TOC) using the LECO C-200 carbon analyzer. The measuring method is based on the combustion of the organic substance contained in the vlp-$TiO_2$ in the induction oven under oxygen gas and the subsequent determination of the carbon dioxide formed using IR detection. The weighed-in quantity is approximately 0.4 g.

d) Determination of the Specific Surface According to BET

The BET surface is measured using a Tristar 3000 (available from Mictromeritics) based on the static volumetric principle.

e) XPS Measurements

The Phi 5600 ESCA spectrometer instrument (pass energy of 23.50 eV; Al standard; 300.0 W; 45.0° C.) was used to measure the bond energies.

f) ESR Measurements

To measure the electron resonance spectra, a Bruker Elexys 580 spectrometer X-band (9.5 GHz) was used. The sample was evacuated up to approximately $10^{-5}$ Torr, filled with helium up to a pressure of approximately $10^{-2}$ Torr and then melted. The measurements were performed under the following conditions:

Magnetic field modulated with approximately 100 Hz, RF power: 0.0002-1 mW, Field: 3340-3500 G, Sweep width: 100-500 G, Conversion time: 81.92 ms, Time constant: 40.96 ms, Modified amplitude: 0.2-13 G, Temperature: 5 K. The g value is determined using a Hall probe.

g) Measurement of the Diffuse Reflection Spectra (Kubelka-Munk Function)

The diffuse reflection spectra of the powders were measured with a Shimadzu UV 2401 PC UVNIS spectrometer, which was equipped with an Ulbricht sphere. Barium sulfate was used as white standard and was used to grind the powders in a mortar prior to the measurement. The Kubelka-Munk function is proportional to the absorbance.

h) Superhydrophilic Properties

For the measurement of the contact angle of water, vlp-$TiO_2$ and unmodified $TiO_2$ were respectively suspended in distilled water, applied to an approximately $5 \times 5$ cm aluminum plate using "dip coating" and calcinated for approximately 1 hour at approximately 400° C. Following storage in daylight, a contact angle of approximately 21° was measured for unmodified titanium dioxide, and a contact angle of only approximately 8° was measured for vlp-$TiO_2$. The contact angle for the uncoated aluminum plate was approximately 91°.

FIG. 12 shows the Kubelka-Munk function of compositions according to the invention in comparison with the Kubelka-Munk function of the photocatalytically active substance used for the manufacture of these compositions. In FIG. 12, a) shows the Kubelka-Munk function of the photocatalytically active substance, and b) shows the Kubelka-Munk function of a composition with styrene acrylate (Alberdingk AS 6002) as a binder.

Still referring to FIG. 12, c) indicates the Kubelka-Munk function of a composition in accordance with the invention with a silicone resin as a binder, d) shows the Kubelka-Munk function of a composition in accordance with the invention with vinyl acetate ethylene (Mowilith LDM 1871) as a binder, and e) shows the Kubelka-Munk function of a composition with a copolymer of a styrene/butyl acrylate (Dilexo AS 151) as a binder.

In embodiments, the binder fraction of the composition in accordance with the invention is approximately 2 to 60 percent by weight, preferably approximately 3 to 50 percent by weight, especially preferably approximately 9 to 35 percent by weight. In various embodiments, the fraction of the photocatalytically-active substance in the coating composition is expediently approximately 2 to 40 percent by weight, preferably approximately 2 to 20 percent by weight, especially preferably approximately 4 to 15 percent by weight. In certain preferred embodiments, the fraction of the photocatalytically-active substance in the coating composition is approximately 5 to 10 percent by weight. In various embodiments, a photocatalytic effect may be obtained to an especially satisfactory extent if the fraction of the photocatalytically-active substance is approximately 5 percent by weight or more. In embodiments, the photocatalytically-active substance has a virtually negligible effect on the remaining properties of coating compositions when the fraction of the photocatalytically-active substance is approximately 10 percent by weight or less.

The invention is not limited to the examples of embodiments explained in reference to the drawings. Instead, the use of compositions with different types of binders is also contemplated. In addition, photocatalytically-active substances are not limited to carbon-doped photocatalytically-active substances. For example, embodiments including sulfur-doped photocatalytically-active substances may be especially advantageous.

Still further, although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. A composition for coating walls, facades, or the like, comprising:
   at least one binder; and
   at least one photocatalytically-active substance with a significant light absorption at one or more absorption wavelength in a range of about 380 nm to about 500 nm, wherein said photocatalytically active substance comprises titanium dioxide ($TiO_2$) which is doped, at least in part, with one or more of sulfur (S) and carbon (C);
   wherein the photocatalytically-active substance has a specific surface of about 100 to about 250 $m^2/g$.

2. The composition of claim 1, wherein the ratio of the light absorbance (Kubelka-Munk function F ($R_{00}$)) for the photocatalytically-active substance to the absorbance (Kubelka-Munk function F ($R_{00}$)) of the binder at one or more absorption wavelengths in the range of about 380 nm to about 500 nm is greater than about $6.25 \times 10^{-3}$.

3. The composition of claim 2, wherein the ratio is greater than about $1 \times 10^{-2}$.

4. The composition of claim 1, wherein at one or more absorption wavelengths in the range of about 380 nm to about 500 nm, the binder has an absorbance (Kubelka-Munk function F ($R_{00}$)) of less than about 0.8, and the photocatalytically-active substance has an absorbance (Kubelka-Munk function F ($R_{00}$)) of more than about 0.005.

5. The composition of claim 4, wherein the absorbance of the binder is less than about 0.5.

6. The composition of claim 4, wherein the photocatalytically-active substance has an absorbance (Kubelka-Munk function F ($R_{00}$)) of more than about 0.01.

7. The composition of claim 6, wherein the photocatalytically-active substance has an absorbance (Kubelka-Munk function F ($R_{00}$)) of more than about 0.02.

8. The composition of claim 4, wherein at one or more absorption wavelengths in the range of about 400 nm to about 450 nm, the binder has an absorbance (Kubelka-Munk function F ($R_{00}$)) of less than about 0.8, and the photocatalytically-active substance has an absorbance (Kubelka-Munk function F ($R_{00}$)) of more than about 0.005.

9. The composition of claim 1, wherein the binder includes at least one organic component and/or at least one inorganic component.

10. The composition of claim 1, wherein the $TiO_2$ is present essentially in an anatase phase.

11. The composition of claim 1, wherein the $TiO_2$ is doped, at least in part, with the one or more of S and C essentially on a surface layer of the $TiO_2$.

12. The composition of claim 1, wherein the $TiO_2$ is doped, at least in part, with nitrogen.

13. The composition of claim 1, wherein the photocatalytically-active substance includes about 0.05 to about 4 percent by weight of the one or more of S and C.

14. The composition of claim 13, wherein the photocatalytically-active substance includes about 0.05 to about 2 percent by weight of the one or more of S and C.

15. The composition of claim 14, wherein the photocatalytically-active substance includes about 0.4 to about 1.5 percent by weight of the one or more of S and C.

16. The composition of claim 15, wherein the photocatalytically-active substance includes about 0.4 to about 0.8 percent by weight of the one or more of S and C.

17. The composition of claim 1, wherein the photocatalytically-active substance exhibits a peak at a bond energy of about 285.6 eV having an intensity greater than an intensity of the oxygen is peak at about 530 eV, as measured by X-ray photoelectron spectroscopy.

18. The composition of claim 1, further comprising one or more additives selected from the group comprising a dispersing agent, a thickening agent, an anti-foaming agent, a pigment, a filler, a hydrophobization agent, and a microbiocide.

19. The composition of claim 1, wherein the composition is a supercritical composition in which a solid fraction including solids is adjusted to a liquid fraction such that the solids are incompletely wetted.

20. The composition of claim 1, further comprising one or more adsorption agents selected from the group comprising activated charcoal, silicic acid, microsilica, silica gel, zeolite, bentonite, diatomaceous earth, and foamed glass.

21. The composition of claim 1, wherein the photocatalytically-active substance exhibits essentially one signal for a g value of about 1.97 to about 2.05, as measured by electron spin resonance at a temperature of about 5 K.

22. The composition of claim 21, wherein the photocatalytically-active substance exhibits essentially one signal for a g value of about 2.002 to about 2.004, as measured by electron spin resonance at a temperature of about 5 K.

23. The composition of claim 1, wherein the Kubelka-Munk function F ($R_{00}$) proportional to the absorbance for the photocatalytically active substance at or about 500 nm is about 50% of the value at or about 400 nm, and at or about 600 nm is about 20% of the value at or about 400 nm.

24. The composition of claim 1, wherein the light absorbance (Kubelka-Munk function F ($R_{00}$)) for the photocatalytically-active substance at or about 500 nm is about 50% of the value at or about 400 nm, and at or about 600 nm is about 20% of the value at or about 400 nm.

25. The composition of claim 1, wherein the composition has a photoactivity of at least about 20%.

26. The composition of claim 25, wherein the composition has a photoactivity of at least about 40%.

27. The composition of claim 26, wherein the composition has a photoactivity of at least about 50%.

28. The composition of claim 1, wherein the photocatalytically-active substance exhibits substantially no carbonate bands as measured by a selected one or more of X-ray photoelectron spectroscopy and infrared spectroscopy.

29. The composition of claim 1, wherein the photocatalytically-active substance has a specific surface of about 130 to about 200 $m^2/g$.

30. The composition of claim 29, wherein the photocatalytically-active substance has a specific surface of about 130 to about 170 $m^2/g$.

* * * * *